United States Patent [19]

Nakagawa

[11] Patent Number: 5,957,684
[45] Date of Patent: Sep. 28, 1999

[54] HEATING METHOD AND APPARATUS

[75] Inventor: Tsuguhiko Nakagawa, Kurashiki, Japan

[73] Assignee: Kawasaki Steel Corporation, Kobe, Japan

[21] Appl. No.: 09/011,556

[22] PCT Filed: Dec. 15, 1997

[86] PCT No.: PCT/JP97/04610

§ 371 Date: Feb. 10, 1998

§ 102(e) Date: Feb. 10, 1998

[87] PCT Pub. No.: WO98/38344

PCT Pub. Date: Sep. 3, 1998

[30] Foreign Application Priority Data

Feb. 28, 1997 [JP] Japan .................................. 9-46490

[51] Int. Cl.$^6$ .................................................. F27D 17/00
[52] U.S. Cl. .......................... 432/181; 432/179; 432/180
[58] Field of Search .................................... 432/179, 180, 432/181

[56] References Cited

U.S. PATENT DOCUMENTS

| 4,666,403 | 5/1987 | Smith | 432/181 |
| 4,671,346 | 6/1987 | Masters et al. | 432/181 |
| 5,431,147 | 7/1995 | Tanaka et al. | 432/181 |
| 5,839,894 | 11/1998 | Schedler et al. | 432/181 |

Primary Examiner—Teresa Walberg
Assistant Examiner—Jiping Lu
Attorney, Agent, or Firm—Oliff & Berridge, PLC

[57] ABSTRACT

A regenerative atmosphere-gas heating system includes at least three regenerative heaters. Each of these regenerative heaters successively cycles through a combustion state, an atmosphere gas heating state and an atmosphere gas sucking state. As a result, the atmosphere gas can be recovered for reuse and the developed heat of the recovered atmosphere gas can be converted into developed heat of the combustion air for an improvement in thermal efficiency.

12 Claims, 6 Drawing Sheets

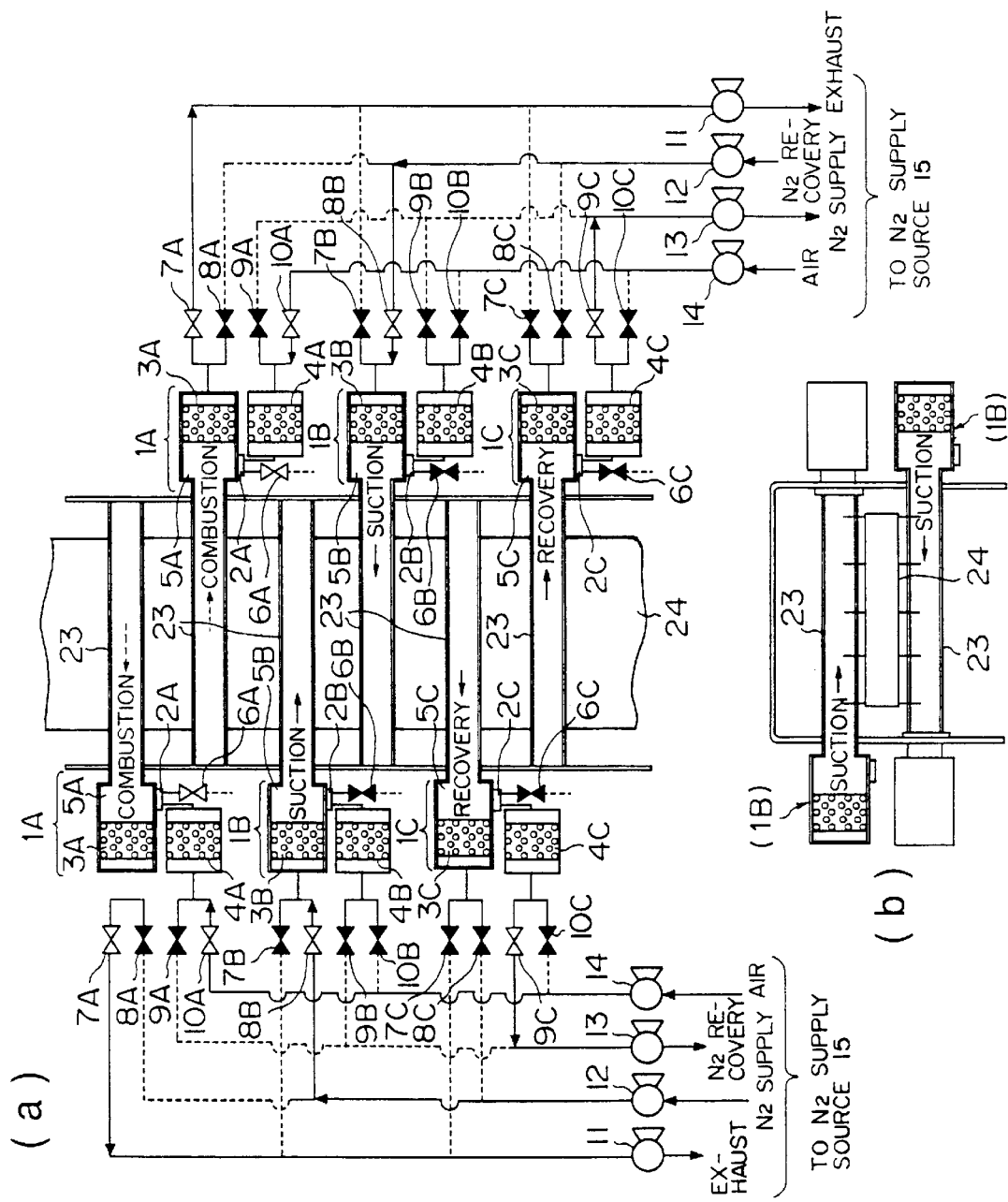

HEATING METHOD AND APPARATUS

TECHNICAL FIELD

The present invention relates to an atmosphere gas heating method and apparatus for continuously heating and supplying an atmosphere gas necessary to heat an object to be heated. The present invention is particularly suitable for when an object to be heated (a tundish body in the case of a tundish) must be heated in a non-oxidizing or reducing atmosphere, as required for tundishes used in heating furnaces, annealing furnaces, heat-treating furnaces and continuous casting for, e.g., blooms and strips.

BACKGROUND ART

Hitherto, there are known the following methods for heating steel materials in various furnaces such as heating furnaces, annealing furnaces and heat-treating furnaces, for example, under a non-oxidizing condition.

(1) Radiant Tube Heating Method ("Recent Practical Combustion Technology": edited by The Iron and Steel Institute of Japan, (1983), p. 31)

According to this method, a radiant tube is disposed in a heating furnace, etc., a high-temperature combustion exhaust gas from a burner unit or a gas having high temperatures raised by the exhaust gas is supplied to the radiant tube, and a steel material is heated with heat radiating from an outer wall of the radiant tube toward the interior of the furnace. Because a furnace atmosphere contacting the steel material can be freely set, it is easy to bring the furnace atmosphere into a non-oxidizing state.

(2) Direct-Flame Reduction Heating Method (The 88-th Nishiyama Kinen Gijutsu Koza (Nishiyama Memorial Technology Lecture), (1983), p. 75)

According to this method, a reducing flame formed in an outer portion of a flame produced by a burner unit is directly put into contact with a steel material to heat it in a reducing atmosphere.

(3) Two-Layer Atmosphere Combustion Method (Nippon Kokan Technical Report, No. 120 (1988), p. 24)

According to this method, a steel material is heated with such a two-layer atmosphere adjustment that a steel material is surrounded by a non-oxidizing atmosphere produced by imperfect combustion, and at the same time secondary combustion is performed in a not-yet-burnt gas area outside the non-oxidizing atmosphere.

Although the above heating methods are adapted for use with heating furnaces, etc. for steel materials, similar methods are also employed in heating nonferrous metals such as aluminum and copper.

The conventional heating methods stated above however have problems as follows.

(1) Radiant Tube Heating Method

This method is very superior in that an oxidizing gas containing $H_2O$ produced by combustion, extra $O_2$ during combustion, etc. can be completely isolated from the furnace atmosphere.

But the following problems are encountered in this method.

a) When the temperature of a heating furnace is as high as 1200° C., for example, there is no effective tube endurable against such a high temperature. In other words, the radiant tube itself is broken due to thermal stresses and high-temperature creep; hence the life of the radiant tube at the high temperature is short.

b) Because the burner unit performs combustion in a narrow space of the radiant tube, there is a limit in combustion capacity of a burner itself.

(2) Direct-Flame Reduction Heating Method

This method requires the reducing atmosphere to be formed near the steel material. The following problems are therefore encountered in this method.

a) From the point of operation, there are restrictions in, e.g., the surface temperature (900° C. or below) of the steel material and combustion conditions (load, air/fuel ratio, burner capacity), etc.

b) From the point of equipment, there are restrictions in, e.g., the distance from the surface of the steel material to the burner.

c) Thermal efficiency is poor because only part of combustion heat available from fuel is utilized. For the above reasons, this method cannot be applied to, e.g., heating furnaces for rolling steel materials.

(3) Two-Layer Atmosphere Combustion Method

The following problems are encountered in this method.

a) Because of forming a two-layer atmosphere, burner layout in the furnace suffers from restrictions in, e.g., that a roof burner and a side burner cannot be used in a combined manner. This raises a problem in evenness of the heating temperature when large-size steel materials are to be heated.

b) A heating ability per unit volume of the furnace is smaller than conventional burners. The furnace volume must be therefore increased, resulting in a larger size of the furnace.

c) When a combustion load fluctuates, the non-oxidizing atmosphere tends to easily break. Thus, it is difficult to apply this method to furnaces undergoing large load fluctuations because the non-oxidizing atmosphere easily changes to an oxidizing atmosphere in such a condition.

Furthermore, the method to create a non-oxidizing atmosphere near a combustion area while burning gas, like the direct-flame reduction heating method and the two-layer atmosphere combustion method, is subject to severe restrictions in the furnace temperature and combustion conditions. More specifically, to obtain a non-oxidizing atmosphere on condition that the steel material temperature is higher than 1200° C., the composition of a combustion gas is required to meet the relationships of $CO/CO_2 > 3.1$ and $H_2/H_2O > 1.2$. When a coke furnace gas, for example, is used as the combustion gas, the gas must be burnt under a condition of air ratio<0.5. But even if the combustion is carried out while meeting those restrictions in operation, it would be difficult to stably maintain a completely non-oxidizing atmosphere near the surface of the steel material, and to prevent sufficiently oxidization of the surface of the steel material in practice.

The present invention has been developed in view of the problems stated above, and intends to quickly raise the temperature of a combustion exhaust gas for thereby improving thermal efficiency. And according to the present invention, it is possible to maintain a non-oxidizing atmosphere by using nitrogen or argon as an atmosphere gas, to create a reducing atmosphere by mixing a reducing gas to the atmosphere gas, and to cut down the cost by recovering such an atmosphere gas for reuse.

DISCLOSURE OF THE INVENTION

To solve the above-mentioned problems, according to Claim 1 of the present invention, there is provided a regenerative atmosphere-gas heating method for heating an atmosphere gas by using burner units and three or more units of regenerative heaters including regenerative chambers provided in lines for exhausting combustion exhaust gases from the burner units, wherein at least one or more of the three or more units of regenerative heaters are each brought into a combustion state in which heat is accumulated in the corresponding regenerative chamber by operating the corresponding burner unit to perform combustion and exhausting only the combustion exhaust gas or substantially only the combustion exhaust gas produced with the combustion through the regenerative chamber, at least other one or more units of the regenerative heaters are each brought into an atmosphere gas heating state in which the atmosphere gas is passed through the corresponding regenerative chamber to heat and supply the atmosphere gas, and at least other one or more units of the regenerative heaters are each brought into an atmosphere gas sucking state in which the atmosphere gas is sucked and recovered, the regenerative heaters being each switched over to take the combustion state, the atmosphere gas heating state and the atmosphere gas sucking state successively in this order so that the heated atmosphere gas is supplied continuously.

The present invention has been made in consideration of limits of conventional methods, e.g., the heating method utilizing radiation from a radiant tube or the like. In the radiant heating method, as well known, when the temperature difference between an object to be heated and an atmosphere becomes small in a high-temperature range, an increase in the temperature of an object to be heated comes into the so-called saturated state, and the object to be heated cannot be heated more even with further prolonged heating time. Consider gas radiation necessary for such a radiant heating method, $CO_2$ and $H_2O$, for example, produce gas radiation, while $N_2$ and Ar, which are required to achieve a non-oxidizing or reducing atmosphere in the above-mentioned strip continuous annealing furnace, etc., produce no gas radiation. It has been therefore thought that the object to be heated, e.g., a strip, can be only heated with radiant heat provided by supplying a combustion exhaust gas, containing $CO_2$, $H_2O$, etc., to the radiant tube, as explained above. However, if $N_2$ or Ar which is required to achieve the non-oxidizing or reducing atmosphere can be heated to a comparable high temperature, the object to be heated can be quickly heated through the so-called convection heat transmission by blowing such a gas directly to the object to be heated, or by filling such a gas inside the object to be heated.

To achieve that, there has been hitherto proposed a technique as follows. A pair of regenerative heaters, for example, are employed and a burner unit of one of the heaters is operated to perform combustion. The one heater simultaneously sucks a combustion exhaust gas produced by the burner unit and an atmosphere gas (e.g., inside the furnace) together, and passes those gases through a regenerative chamber for accumulating the developed heat of the combustion exhaust gas (and the atmosphere gas) in the regenerative chamber. The other regenerative heater passes the atmosphere gas, such as an inert gas, through its regenerative chamber which has been already heated sufficiently, for recovering the accumulated heat as developed heat of the atmosphere gas and supplying the heated atmosphere gas directly to the interior of a furnace. By switching over the pair of regenerative chambers to alternately take one of those two states in sequence, the heated atmosphere gas can be supplied continuously. Further, since a thin wall member, such as a tube, subject to high temperatures is not required in the regenerative heater, it is possible to easily heat the atmosphere gas, for example, to 1500° C. or above, for example. A problem particularly encountered in the above technique is that when the atmosphere gas is, e.g., a non-oxidizing atmosphere gas or a reducing atmosphere gas containing $H_2$, etc., the sucked atmosphere gas contains an O component of the combustion exhaust gas mixed therein and cannot be used at least as it is.

In this feature of the present invention, therefore, three or more units of regenerative heaters are employed, one or more units of the regenerative heaters are each brought into a combustion state in which a burner unit is operated to perform combustion and at least only a combustion exhaust gas produced with the combustion is exhausted through its regenerative chamber, other one or more units of the regenerative heaters are each brought into an atmosphere gas heating state in which an atmosphere gas is passed through its regenerative chamber, in which heat has been accumulated, to heat and supply the atmosphere gas, and other one or more units of the regenerative heaters are each brought into an atmosphere gas sucking state in which an extra atmosphere gas is sucked and recovered. By switching over the combustion state, the atmosphere gas heating state and the atmosphere gas sucking state successively in this order for each of the regenerative heaters, the heated atmosphere gas can be supplied continuously and the extra atmosphere gas can be recovered continuously to be used again for heating and supplying a succeeding atmosphere gas.

According to Claim 2 of the present invention, there is provided a regenerative atmosphere-gas heating method for heating an atmosphere gas by using burner units and three or more units of regenerative heaters including first regenerative chambers provided in lines for exhausting combustion exhaust gases from the burner units and second regenerative chambers provided in lines for sucking the atmosphere gas, wherein at least one or more of the three or more units of regenerative heaters are each brought into a combustion state in which heat is accumulated in the corresponding first regenerative chamber by operating the corresponding burner unit to perform combustion and exhausting only the combustion exhaust gas or substantially only the combustion exhaust gas produced with the combustion through the first regenerative chamber, at least other one or more units of the regenerative heaters are each brought into an atmosphere gas heating state in which the atmosphere gas is passed through the corresponding first regenerative chamber to heat and supply the atmosphere gas, and at least other one or more units of the regenerative heaters are each brought into an atmosphere gas sucking state in which the atmosphere gas is sucked and recovered after being passed through the corresponding second regenerative chamber, for thereby accumulating heat in the second regenerative chamber, the regenerative heaters being each switched over to take the combustion state, the atmosphere gas heating, state and the atmosphere gas sucking state successively in this order so that the heated atmosphere gas is supplied continuously.

In this feature of the present invention, three or more units of regenerative heaters are employed as with the regenerative heating method of Claim 1. But, the regenerative heaters are each provided with a second regenerative chamber disposed in a line for sucking the atmosphere gas, separately from a first regenerative chamber which is disposed in a line for sucking the atmosphere gas as conventionally. Then, in this feature of the present invention, one or more units of the regenerative heaters are each brought into a combustion state in which a burner unit is operated to perform combustion and at least only a combustion exhaust gas produced with the combustion is exhausted through its first regenerative chamber, other one or more units of the regenerative heaters are each brought into an atmosphere gas heating state in which an atmosphere gas is passed through its first regenerative chamber, in which heat has been accumulated, to heat and supply the atmosphere gas, and other one or more units of the regenerative heaters are each brought into an atmosphere gas sucking state in which an extra atmosphere gas is sucked and recovered after being passed through its second regenerative chamber. By switching over the combustion state, the atmosphere gas heating state and the atmosphere gas sucking state successively in this order for each of the regenerative heaters, the heated atmosphere gas can be supplied continuously. In addition, it is also possible to not only recover the extra atmosphere gas continuously to be used again for heating and supplying a succeeding atmosphere gas, but also accumulate the developed heat of the sucked and recovered atmosphere gas in the second regenerative chamber. Accordingly, by passing a combustion gas, e.g., combustion air, or part thereof through that second regenerative chamber in the succeeding combustion state for conversion of the accumulated heat into developed heat of the combustion air, the temperature of the combustion exhaust gas in that combustion state can be raised quickly immediately after the start of the combustion. In other words, the heating can be started from a relatively high temperature, and hence overall thermal efficiency can be increased, including, e.g., the process of heat being accumulated in the first regenerative chamber under the combustion state.

In the regenerative atmosphere-gas heating method according to Claim 3 of the present invention, combustion air or part thereof supplied to the burner unit is supplied to the regenerative heater in the combustion state after being passed through the second regenerative chamber in which heat has been accumulated in the atmosphere gas sucking state.

With this feature of the present invention, by passing a combustion gas, e.g., combustion air, or part thereof through the second regenerative chamber, in which the developed heat of the atmosphere gas has been accumulated, for conversion into developed heat of the combustion air, the temperature of the combustion exhaust gas in the combustion state can be raised quickly immediately after the start of the combustion. In other words, the heating can be started from a relatively high temperature, and hence overall thermal efficiency can be increased, including, e.g., the process of heat being accumulated in the first regenerative chamber under the combustion state. Also, since the temperature of the combustion exhaust gas rise quickly, a shift of from the atmosphere gas sucking state to the combustion state, in particular, is expedited and the operation can be continued in a smoother manner.

In the regenerative atmosphere-gas heating method according to Claim 4 of the present invention, one of nitrogen and argon gases or a mixture of both the gases is used as the atmosphere gas.

With this feature of the present invention, by using nitrogen, argon or other similar gas as an atmosphere gas, it is possible to maintain the atmosphere gas as a non-oxidizing atmosphere gas. Accordingly, the heated atmosphere gas can be applied to, e.g., an object to be heated, such as a tundish or strip, which requires a non-oxidizing condition.

In the regenerative atmosphere-gas heating method according to Claim 5 of the present invention, the atmosphere gas is used as a reducing high-temperature gas by mixing a reducing gas, containing $H_2$ or the like, to the atmosphere gas.

With this feature of the present invention, by mixing a reducing gas, containing $H_2$ or the like, to the atmosphere gas, it is possible to maintain the atmosphere gas as a reducing atmosphere gas. Accordingly, the heated atmosphere gas can be applied to, e.g., an object to be heated, such as a tundish or strip, which requires a non-oxidizing and reducing condition.

According to Claim 6 of the present invention, there is provided a regenerative atmosphere-gas heating apparatus for continuously supplying a high-temperature atmosphere gas heated by using at least three or more units of the regenerative heaters, wherein each of the regenerative heaters includes a combustion burner, a first regenerative chamber provided in a line for exhausting a combustion exhaust gas from the burner unit, and a second regenerative chamber provided in a line for sucking the atmosphere gas, at least one or more of the three or more units of regenerative heaters are each brought into a combustion state in which heat is accumulated in the first regenerative chamber by operating the burner unit to perform combustion and exhausting only the combustion exhaust gas or substantially only the combustion exhaust gas produced with the combustion through the first regenerative chamber, at least other one or more units of the regenerative heaters are each brought into an atmosphere gas heating state in which the atmosphere gas is passed through the first regenerative chamber to heat and supply the atmosphere gas, and at least other one or more units of the regenerative heaters are each brought into an atmosphere gas sucking state in which the atmosphere gas is sucked and recovered after being passed through the second regenerative chamber, for thereby accumulating heat in the second regenerative chamber, the regenerative heaters being each switched over to take the combustion state, the atmosphere gas heating state and the atmosphere gas sucking state successively in this order.

In this feature of the present invention, three or more units of regenerative heaters are employed as with the regenerative heating method of Claim 2. Then, one or more units of the regenerative heaters are each brought into a combustion state in which a burner unit is operated to perform combustion and at least only a combustion exhaust gas produced with the combustion is exhausted through its first regenerative chamber, other one or more units of the regenerative heaters are each brought into an atmosphere gas heating state in which an atmosphere gas is passed through its first regenerative chamber, in which heat has been accumulated, to heat and supply the atmosphere gas, and other one or more units of the regenerative heaters are each brought into an atmosphere gas sucking state in which an extra atmosphere gas is sucked and recovered after being passed through its second regenerative chamber. By switching over the combustion state, the atmosphere gas heating state and the atmosphere gas sucking state successively in this order for each of the regenerative heaters, the heated atmosphere gas can be supplied continuously. In addition, it is also possible to not only recover the extra atmosphere gas continuously to be used again for heating and supplying a succeeding atmosphere gas, but also accumulate the developed heat of the sucked and recovered atmosphere gas in the second regenerative chamber. Accordingly, by passing a combustion gas, e.g., combustion air, or part thereof through that second regenerative chamber in the succeeding combustion state for conversion of the accumulated heat into developed heat of the combustion air, the temperature of the combustion exhaust gas in that combustion state can be raised quickly immediately after the start of the combustion. In other words, the heating can be started from a relatively high temperature, and hence overall thermal efficiency can be increased, including, e.g., the process of heat being accumulated in the first regenerative chamber under the combustion state.

In the regenerative atmosphere-gas heating apparatus according to Claim 7 of the present invention, the second regenerative chamber of each of the regenerative heaters is a preheater for combustion air supplied to the burner unit.

With this feature of the present invention, the second regenerative chamber of each of the regenerative heaters is used as a preheater for combustion air. By passing the combustion air through the second regenerative chamber, in which the developed heat of the atmosphere gas has been accumulated, for conversion into developed heat of the combustion air, the temperature of the combustion exhaust gas in the combustion state can be raised quickly immediately after the start of the combustion. In other words, the heating can be started from a relatively high temperature, and hence overall thermal efficiency can be increased, including, e.g., the process of heat being accumulated in the first regenerative chamber under the combustion state. Also, since the temperature of the combustion exhaust gas rise quickly, a shift of from the atmosphere gas sucking state to the combustion state, in particular, is expedited and the operation can be continued in a smoother manner.

In the regenerative atmosphere-gas heating apparatus according to Claim 8 of the present invention, a supply line of the atmosphere gas and a recovery line of the atmosphere gas are connected to an atmosphere gas supply source including an atmosphere gas tank common to the supply and recovery lines.

With this feature of the present invention, by connecting a supply line and a recovery line for the atmosphere gas to the same atmosphere gas supply source, the atmosphere gas recovered in the atmosphere gas sucking state can be surely used again in the succeeding atmosphere gas heating state. As a result, the cost of raw materials can be reduced correspondingly.

In the regenerative atmosphere-gas heating apparatus according to Claim 9 of the present invention, one of nitrogen and argon gases or a mixture of both the gases is used as the atmosphere gas.

With this feature of the present invention, by using nitrogen, argon or other similar gas as an atmosphere gas, it is possible to maintain the atmosphere gas as a non-oxidizing atmosphere gas. Accordingly, the heated atmosphere gas can be applied to, e.g., an object to be heated, such as a tundish or strip, which requires a non-oxidizing condition.

In the regenerative atmosphere-gas heating apparatus according to Claim 10 of the present invention, the atmosphere gas is used as a reducing high-temperature gas by mixing a reducing gas, containing $H_2$ or the like, to the atmosphere gas.

With this feature of the present invention, by mixing a reducing gas, containing $H_2$ or the like, to the atmosphere gas, it is possible to maintain the atmosphere gas as a reducing atmosphere gas. Accordingly, the heated atmosphere gas can be applied to, e.g., an object to be heated, such as a tundish or strip, which requires a non-oxidizing and reducing condition.

BRIEF DESCRIPTION OF THE DRAWINGS

FIGS. 6(a) and 6(b) is a schematic diagram of a fourth embodiment in which the regenerative atmosphere-gas heating method and apparatus of the present invention are implemented as a bloom heating furnace.

BEST MODE FOR CARRYING OUT THE INVENTION

First Embodiment

Figure 1:
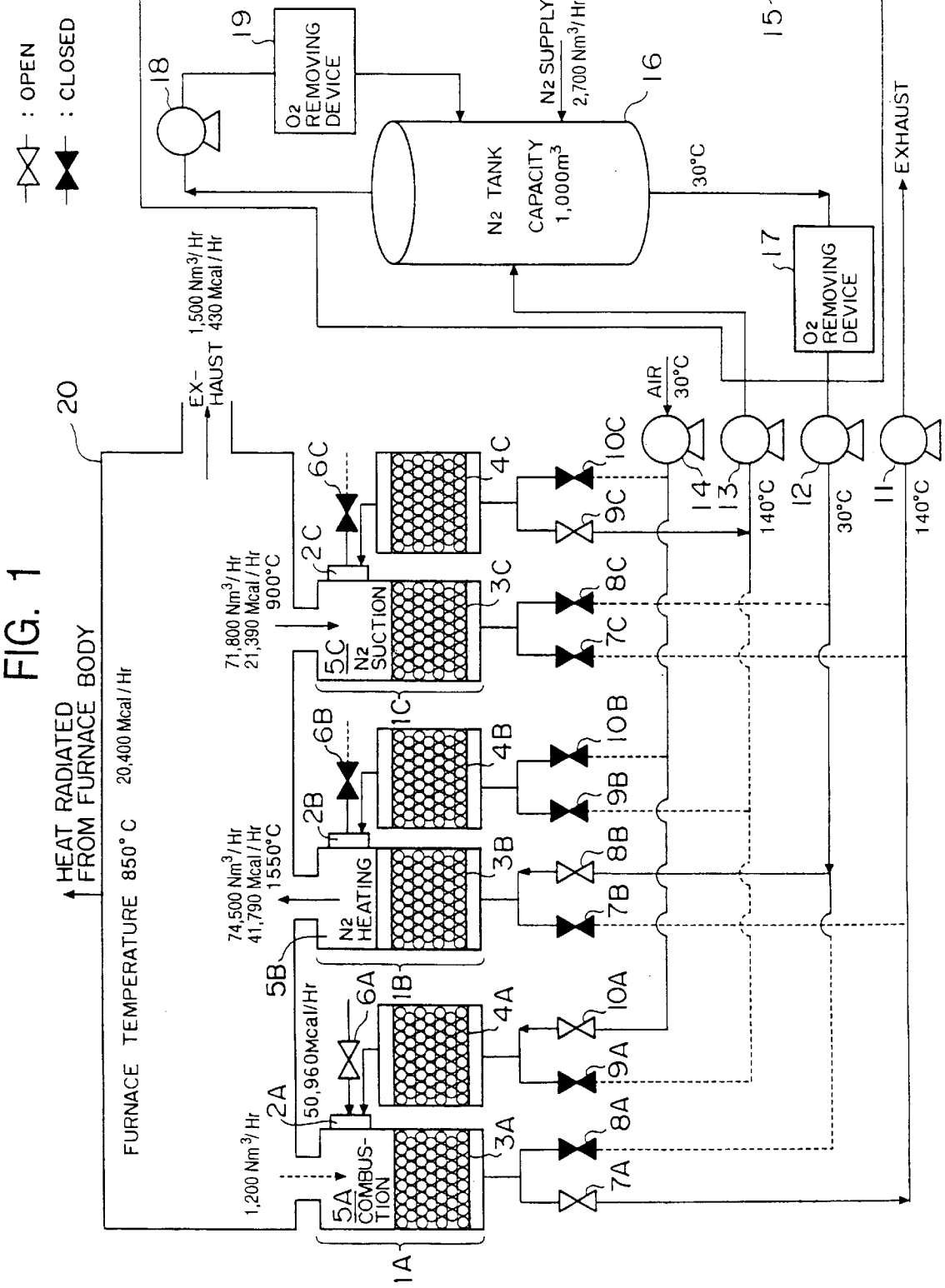
FIG. 1 is a schematic diagram of a first embodiment in which a regenerative atmosphere-gas heating method and apparatus of the present invention are implemented as a batch type heating furnace.

FIG. 1 shows a first embodiment in which a regenerative atmosphere-gas heating method and apparatus of the present invention are implemented as a batch type heating furnace. The heating method and apparatus of the present invention is particularly effective in the case of requiring a heating area to be held under a non-oxidizing atmosphere or a non-oxidizing atmosphere having a reducing property (this atmosphere is referred to as a reducing atmosphere in this embodiment) as described later. In the embodiment of FIG. 1, $N_2$ is used as an atmosphere gas.

As is seen from FIG. 1, three units of regenerative heaters 1A–1C are installed as one set in a heating furnace 20 of this embodiment. These regenerative heaters 1A–1C are provided with second regenerative chambers 4A–4C disposed in gas supply lines leading to burner units 2A–2C, respectively, separately from first regenerative chambers 3A–3C which are disposed as conventionally adjacent to the burning side of the burner units 2A–2C. Additionally, regenerators being, e.g., spherical or cylindrical and made of, e.g., ceramic are filled in each of the regenerative chambers 3A–3C, 4A–4C as conventionally.

The burner units 2A–2C of the regenerative heaters 1A–1C are connected to the second regenerative chambers 4A–4C, as mentioned above, and also to an M gas supply source (not shown) through respective M gas valves 6A–6C which control supply of an M gas. Combustion chambers 5A–5C of the burner units 2A–2C are communicated with the interior of the heating furnace 20. Note that the M gas means a fuel gas burnt in the combustion chamber of each burner unit.

Further, the first regenerative chambers 3A–3C are connected to an exhaust line through exhaust valves 7A–7C and an exhaust fan 11, and also to an $N_2$ supply source 15, described later, through $N_2$ blow valves 8A–8C and an $N_2$ blow fan 12. The second regenerative chambers 4A–4C are connected to an $N_2$ supply source 15, described later, through $N_2$ recovery valves 9A–9C and an $N_2$ recovery fan 13, and to an air supply line through air valves 10A–10C and an air fan 14.

The $N_2$ supply sources 15 are constructed as a common source including an $N_2$ tank (with capacity of 1000 $m^3$, for example) 16. Directly connected to the $N_2$ tank 16 are the second regenerative chambers 4A–4C of the regenerative heaters 1A–1C via connection lines in which the $N_2$ recovery valves 9A–9C and the $N_2$ recovery fan 13 are disposed. Also, connected to the $N_2$ tank 16 through an $O_2$ removing device 17 are the first regenerative chambers 3A–3C of the regenerative heaters 1A–1C via connection lines in which the $N_2$ blow valves 8A–8C and the $N_2$ blow fan 12 are disposed. In the $N_2$ supply source 15, a fan 18 is attached to the $N_2$ tank 16 and $N_2$ sucked by the fan 18 is supplied to an $O_2$ removing device 19 separate from the above $O_2$ removing device 19 so that $N_2$ from which an O component has been removed by the $O_2$ removing device 19 is returned to the $N_2$ tank 16 again. Additionally, an $N_2$ resupply line for resupplying $N_2$ in amount exhausted from the heating furnace 20 described later is connected to the $N_2$ tank 16.

Figure 2:
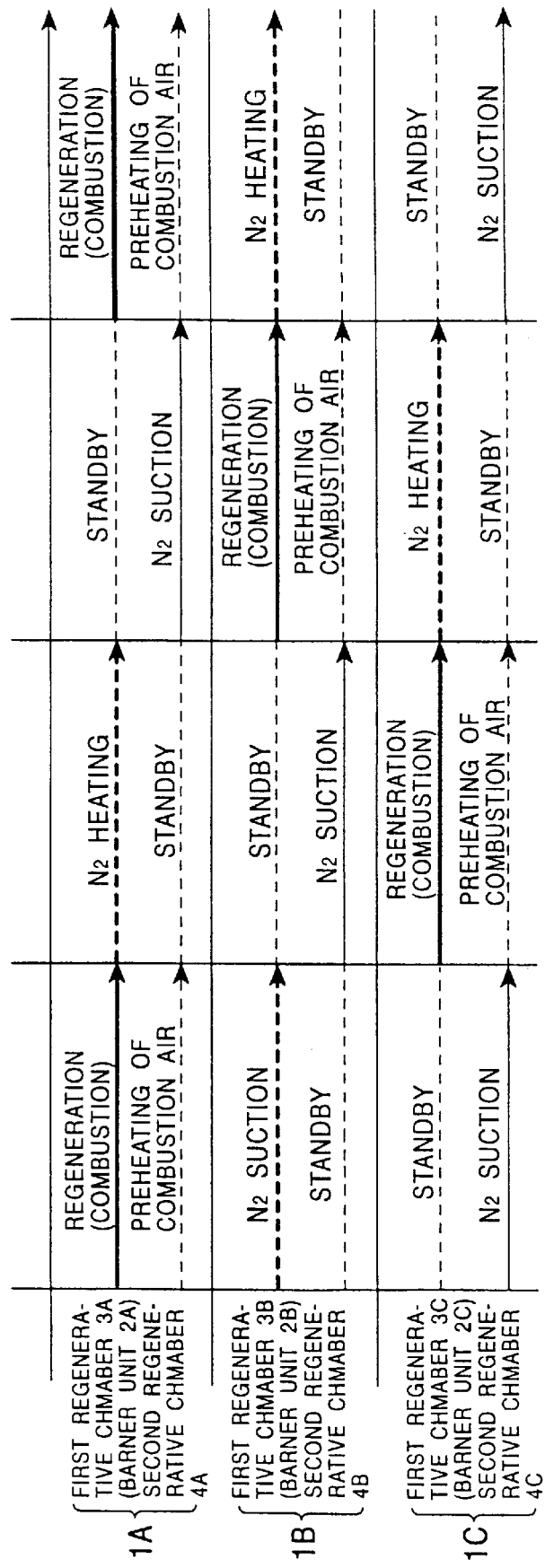
FIG. 2 is a diagram for explaining switching of an operation state of the regenerative atmosphere-gas heating method and apparatus shown in FIG. 1.

FIG. 2 shows switching of a combustion state, heating state, and an $N_2$ suction state of each of the regenerative heaters 1A–1C.

The condition shown in FIG. 1 represents that a system of the left-end regenerative heater (referred to also as a first regenerative heater) 1A is in the combustion state, a system of the central regenerative heater (referred to also as a second regenerative heater) 1B is in the $N_2$ heating state, and a system of the right-end regenerative heater (referred to also as a third regenerative heater) 1C is in the $N_2$ suction state. Of these states, the combustion state is a state where the burner units 2A–2C are operated to perform combustion. The $N_2$ heating state is a state where $N_2$ is heated and supplied to the heating furnace. The $N_2$ suction state where $N_2$ is sucked from the heating furnace. Correspondingly, as shown at the left end of FIG. 2, in the system of the first regenerative heater 1A which is under the combustion state, the burner 2A is in the combustion state (with the first regenerative chamber 3A held in a regeneration state), and at the same time the second regenerative chamber 4A is in a preheating state of combustion air. Also, in the system of the second regenerative heater 1B which is under the $N_2$ heating state, $N_2$ from the $N_2$ supply source 15 is introduced for heating thereof to the first regenerative chamber 3B which has been so far in the combustion state and hence the regeneration state (with the second regenerative chamber 4B held in a standby state). In the system of the third regenerative heater 1C which is under the $N_2$ suction state, $N_2$ in the heating furnace is introduced to the second regenerative chamber 3C from which heat has been so far removed in the $N_2$ heating state subsequent to the combustion state, thereby accumulating the developed heat of $N_2$ in the second regenerative chamber 3C (with the first regenerative chamber 4C held in the standby state).

As the above condition continues, the temperature of $N_2$ supplied to the heating furnace from the second regenerative heater 1B in the $N_2$ heating state lowers gradually. At the same time, the temperature in the first regenerative chamber 3A of the first regenerative heater 1A in the combustion state rises gradually. Of course, there are a lower limit value in the former lowering temperature and an upper limit value in the latter rising temperature, respectively. Therefore, when either one or both of the limit values are reached, the operation state is switched over as follows, by way of example, in this embodiment. The system of first regenerative heater 1A which has been so far in the combustion state is switched over to the $N_2$ heating state for supplying $N_2$ heated to a maximum temperature to the heating furnace. In addition, the system of second regenerative heater 1B which has been so far in the $N_2$ heating state is switched over to the $N_2$ suction state for accumulating the developed heat of $N_2$ in the heating furnace in the second regenerative chamber 4B, and the system of third regenerative heater 1C which has been so far in the $N_2$ suction state is switched over to the combustion state for bringing the first regenerative chamber 3A into the regeneration state. Then, with further continuation of the above condition, when the temperature of $N_2$ supplied to the heating furnace from the first regenerative heater 1A in the $N_2$ heating state lowers down to the lower limit value or when the temperature in the first regenerative chamber 3C of the third regenerative heater 1C in the combustion state rises up to the upper limit value, the first regenerative heater 1A which has been so far in the $N_2$ heating state is switched over to the $N_2$ suction state for accumulating the developed heat of $N_2$ in the heating furnace in the second regenerative chamber 4A, the system of second regenerative heater 1B which has been so far in the $N_2$ suction state is switched over to the combustion state for bringing the first regenerative chamber 3B into the regeneration state, and the system of third regenerative heater 1C which has been so far in the combustion state is switched over to the $N_2$ heating state for supplying $N_2$ heated to a maximum temperature to the heating furnace. By repeating the above switching process in the predetermined timed relationship successively, the heated $N_2$ at the high temperature is continuously supplied to the heating furnace, while extra $N_2$ in the heating furnace is continuously recovered.

Figure 3:
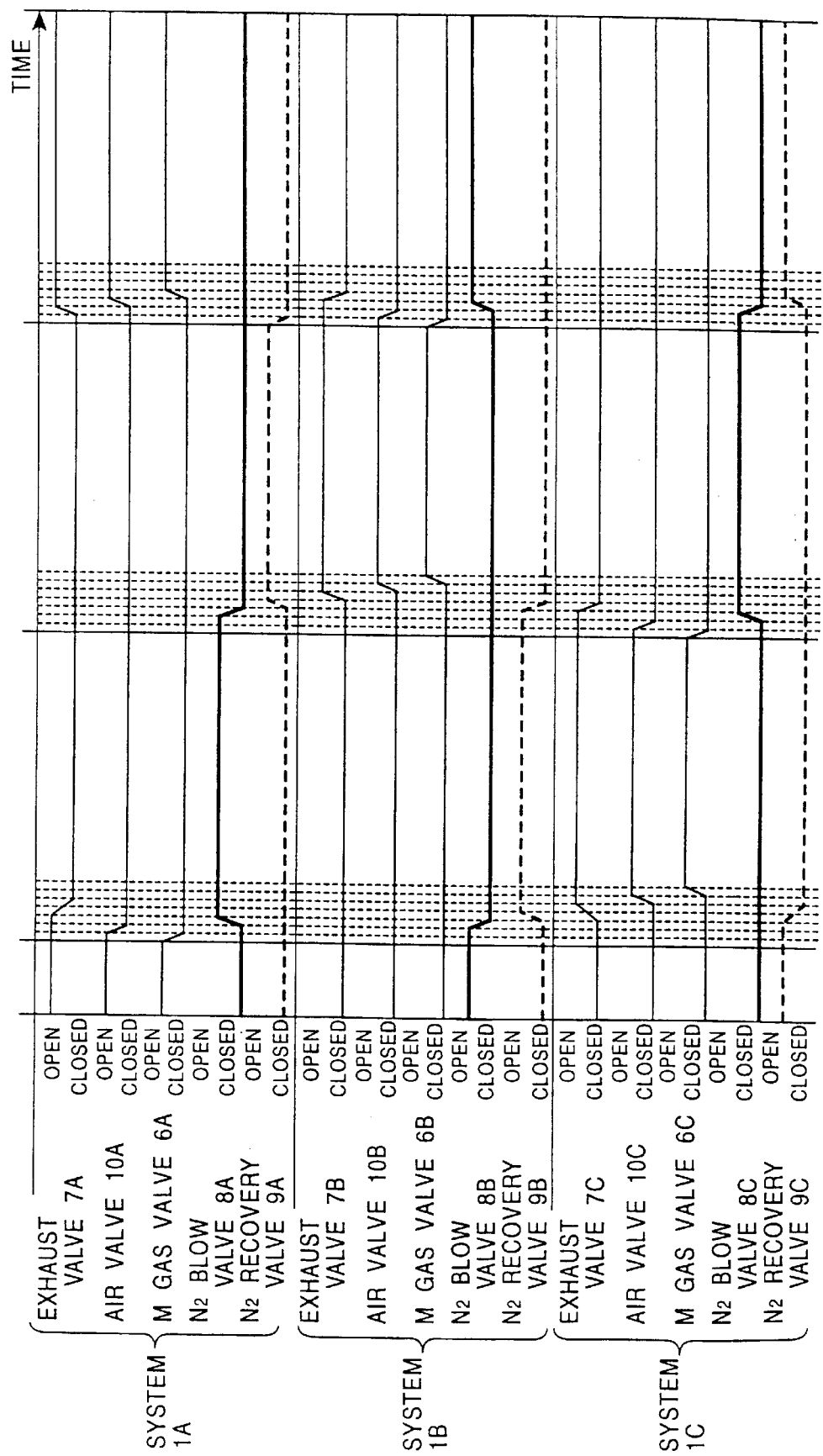
FIG. 3 is a sequence chart of switching of control valves in the regenerative atmosphere-gas heating method and apparatus shown in FIG. 1.

Further, in this embodiment, the above-mentioned control valves are controlled to open and close by a process computer, not shown, in accordance with the timed relationships shown in a sequence chart of FIG. 3 to ensure that the heated $N_2$ at the high temperature is continuously supplied to the heating furnace, extra $N_2$ in the heating furnace is continuously recovered, and combustion exhaust gases from the burner units, more particularly, O components in the combustion exhaust gases, are prevented from flowing into the heating furnace and disturbing a non-oxidizing atmosphere or a reducing atmosphere in the heating furnace. In the sequence chart, a left-end area represents that the system of first regenerative heater 1A is in the combustion state, the system of second regenerative heater 1B is in the $N_2$ heating state, and the system of third regenerative heater 1C is in the $N_2$ suction state. At this time, in the system of first regenerative heater 1A under the combustion state, the exhaust valve 7A, the air valve 10A and the M gas valve 6A are opened, while the $N_2$ blow valve 8A and the $N_2$ recovery valve 9A are closed. Also, in the system of second regenerative heater 1B under the $N_2$ heating state, the exhaust valve 7B, the air valve 10B, the M gas valve 6B and the $N_2$ recovery valve 9B are closed, while only the $N_2$ blow valve 8B opened. Further, in the system of third regenerative heater 1C under the $N_2$ suction state, the exhaust valve 7C, the air valve 10C, the M gas valve 6C and the $N_2$ blow valve 8C are closed, while the $N_2$ recovery valve 9C is closed. It is to be noted that, including the above open conditions, opening degrees of or flow rates through the various control valves in open conditions described later are set beforehand. This point will be described later in detail.

For switching over the system of first regenerative heater 1A, the system of second regenerative heater 1B and the system of third regenerative heater 1C from the above states to the $N_2$ heating state, the $N_2$ suction state and the combustion state, respectively, the M gas valve 6A of the system of first regenerative heater 1A which has been so far in the combustion state is closed, and after the M gas valve 6A has been completely closed, the air valve 10A also associated with the system of first regenerative heater 1A is closed. Accordingly, the combustion is first ended and then only the combustion air continues to be ejected from the burner unit 2A to purge the M gas, that has not been yet burnt, out of the first regenerative heater 1A so that there remains no not-yet-burnt M gas therein. At this time, although the combustion air continues to be ejected from the burner unit 2A, the exhaust valve 7A of the system of first regenerative heater 1A remains open. Therefore, the combustion air is direct exhausted via the exhaust line without being used for the combustion, and is prevented from flowing into the heating furnace. The non-oxidizing atmosphere or the reducing atmosphere in the heating furnace can be thus maintained.

Then, after the air valve 10A of the system of first regenerative heater 1A has been completely closed, the $N_2$ blow valve 8A of the system of first regenerative heater 1A is opened, and at the same time the $N_2$ blow valve 8B of the system of second regenerative heater 1B which has been so far in the $N_2$ heating state is closed. At this time, a rate at which the amount of $N_2$ blown from the open-going $N_2$ blow valve 8A of the system of first regenerative heater 1A increases per unit time, i.e., an $N_2$ blow increasing speed, and a rate at which the amount of $N_2$ blown from the close-going $N_2$ blow valve 8B of the system of second regenerative heater 1B decreases per unit time, i.e., an $N_2$ blow decreasing speed, are set such that both the rates or speeds are equal to each other in absolute amount, but different in direction from each other. Accordingly, by starting to open the $N_2$ blow valve 8A of the system of first regenerative heater 1A and close the $N_2$ blow valve 8B of the system of second regenerative heater 1B at the same time, the flow rate of the heated $N_2$ introduced to the heating furnace can be always kept constant, including the above switching process.

After the $N_2$ blow valve 8A of the system of first regenerative heater 1A has been completely opened and simultaneously the $N_2$ blow valve 8B of the system of second regenerative heater 1B has been completely closed, the exhaust valve 7A of the system of first regenerative heater 1A is closed. At the same time, the exhaust valve 7C of the system of third regenerative heater 1C which has been so far in the $N_2$ suction state is opened, and correspondingly the $N_2$ recovery valve 9B of the system of second regenerative heater 1B is opened. Furthermore, at the same time, the $N_2$ recovery valve 9C of the system of third regenerative heater 1C which has been so far in the $N_2$ suction state is closed. In the above switching operation, a rate at which the amount of gas exhausted through the close-going exhaust valve 7A of the system of first regenerative heater 1A decreases per unit time, i.e., an exhaust gas decreasing speed, and a rate at which the amount of gas exhausted through the open-going exhaust amount 7C of the system of third regenerative heater 1C increases per unit time, i.e., an exhaust gas increasing speed, are set such that both the rates or speeds are equal to each other in absolute-amount, but different in direction from each other. Accordingly, by starting to close the exhaust valve 7A of the system of first regenerative heater 1A and open the exhaust valve 7C of the system of third regenerative heater 1C at the same time, the total flow rate of the exhaust gas can be always kept constant, including the above switching process. Also, a rate at which the amount of $N_2$ recovered through the open-going $N_2$ recovery valve 9B of the system of second regenerative heater 1B increases per unit time, i.e., an $N_2$ recovery increasing speed, and a rate at which the amount of $N_2$ recovered through the close-going $N_2$ recovery valve 9C of the system of third regenerative heater 1C decreases per unit time, i.e., an $N_2$ recovery decreasing speed, are set such that both the rates or speeds are equal to each other in absolute amount, but different in direction from each other. Accordingly, by starting to open the $N_2$ recovery valve 9B of the system of second regenerative heater 1B and close the $N_2$ recovery valve 9C of the system of third regenerative heater 1C at the same time, the flow rate of the recovered $N_2$ can be always kept constant, including the above switching process.

After the exhaust valve 7A of the system of first regenerative heater 1A has been completely closed, the exhaust valve 7C of the system of third regenerative heater 1C has been completely opened, the $N_2$ recovery valve 9B of the system of second regenerative heater 1B has been completely opened, and the $N_2$ recovery valve 9C of the system of third regenerative heater 1C has been completely closed, the air valve 10C of the system of third regenerative heater 1C is now opened. After the air valve 10C has been completely opened, the M gas valve 6C also associated with the system of third regenerative heater 1C is opened, and simultaneously the burner unit 2C of the system of third regenerative heater 1C is ignited by using a pilot burner or the like (not-shown). At this time, because the exhaust valve 7C of the system of third regenerative heater 1C is already in the open state, air ejected from the burner unit 2C upon opening of the air valve 10C of the system of third regenerative heater 1C is direct exhausted without flowing into the heating furnace. Also, because the burner unit 2C is ignited at the same time as when the M gas valve 6C of the system of third regenerative heater 1C is opened, there is no possibility that the not-yet-burnt M gas remains and is exhausted to the exterior.

In the above process, at the time the $N_2$ blow valve 8A of the system of first regenerative heater 1A is brought into a completely open state, heated $N_2$ begins to be steadily blown into the heating furnace from the system of first regenerative heater 1A. Further, at the time the $N_2$ recovery valve 9B of the system of second regenerative heater 1B is brought into a completely open state, extra $N_2$ begins to be steadily sucked and recovered through the heating furnace through the system of second regenerative heater 1B. Subsequently, the exhaust valve 7A of the system of first regenerative heater 1A is closed, and the exhaust valve 7C, the air valve 10C and the M gas valve 6C of the system of third regenerative heater 1C are opened and closed. Thus, in the system of third regenerative heater 1C, the burner unit 2C is brought into a steady combustion state only after the M gas valve 6C has been completely opened. The period from the time when the M gas valve 6A of the system of first regenerative heater 1A starts its closing operation to the time when the M gas valve 6C of the system of third regenerative heater 6C completes its opening operation is therefore called a switching period.

In this condition, the system of first regenerative heater 1A performs heating and supply of $N_2$, the system of second regenerative heater 1B accumulates heat in the second regenerative chamber 4B while sucking and recovering $N_2$, and the system of third regenerative heater 1C performs combustion of the burner unit 2C and accumulates heat in the first regenerative chamber 3C. Then, in a similar manner as explained above, when the temperature of $N_2$ supplied to the heating furnace from the first regenerative heater 1A lowers down to the lower limit value or when the temperature in the first regenerative chamber 3C of the third regenerative heater 1C in the combustion state rises up to the upper limit value, the M gas valve 6C of the third regenerative heater 1C which has been so far in the combustion state is closed, and after it has been completely closed, the air valve 10C also associated with the system of third regenerative heater 1C is closed so that the not-yet-burnt M gas is prevented from remaining there. On this occasion, the combustion air is direct exhausted to the exhaust line to hold the non-oxidizing atmosphere or a reducing atmosphere in the heating furnace.

Subsequently, after the air valve 10C of the system of third regenerative heater 1C has been completely closed, the $N_2$ blow valve 8C also associated with the system of third regenerative heater 1C is opened, and at the same time the $N_2$ blow valve 8A of the system of first regenerative heater 1A which has been so far in the $N_2$ heating state is closed. Also in this case, a speed at which the amount of $N_2$ blown from the open-going $N_2$ blow valve 8C of the system of third regenerative heater 1C increases, and a speed at which the amount of $N_2$ blown from the close-going $N_2$ blow valve 8A of the system of first regenerative heater 1A decreases are set such that both the speeds are equal to each other in absolute amount, but different in direction from each other. Accordingly, by starting to open the $N_2$ blow valve 8C of the system of third regenerative heater 1C and close the $N_2$ blow valve 8A of the system of first regenerative heater 1A at the same time, the flow rate of the heated $N_2$ blown into the heating furnace during the above switching process can be always kept constant.

After the $N_2$ blow valve 8C of the system of third regenerative heater 1C has been completely opened and at the same time the $N_2$ blow valve 8A of the system of first regenerative heater 1A has been completely closed, the exhaust vale 7C of the system of third regenerative heater 1C is closed and at the same time the exhaust valve 7B of the system of second regenerative heater 1B which has been so far in the $N_2$ suction state is opened. Correspondingly, the $N_2$ recovery valve 9A of the system of first regenerative heater 1A is opened and at the same time the $N_2$ recovery valve 9B of the system of second regenerative heater 1B is closed. Also at this time, a speed at which the amount of gas exhausted through the close-going exhaust valve 7C of the system of third regenerative heater 1C decreases, and a speed at which the amount of gas exhausted through the open-going exhaust amount 7B of the system of second regenerative heater 1B increases are set such that both the speeds are equal to each other in absolute amount. Then, the operation of closing the exhaust valve 7C of the system of third regenerative heater 1C and the operation of opening the exhaust valve 7B of the system of second regenerative heater 1B are started at the same time. As a result, the total flow rate of the exhaust gas during the above switching process can be always kept constant. Further, a speed at which the amount of $N_2$ recovered through the open-going $N_2$ recovery valve 9A of the system of first regenerative heater 1A increases, and a speed at which the amount of $N_2$ recovered through the close-going $N_2$ recovery valve 9B of the system of second regenerative heater 1B increases are set such that both the speeds are equal to each other in absolute amount. Then, the operation of opening the $N_2$ recovery valve 9A of the system of third regenerative heater 1A and the operation of closing the $N_2$ recovery valve 9B of the system of second regenerative heater 1B are started at the same time. As a result, the flow rate of $N_2$ recovered during the above switching process can be always kept constant.

Next, after the exhaust valve 7C of the system of third regenerative heater 1C has been completely closed, the exhaust valve 7B of the system of second regenerative heater 1B has been completely opened, the $N_2$ recovery valve 9A of the system of first regenerative heater 1A has been completely opened, and the $N_2$ recovery valve 9B of the system of second regenerative heater 1B has been completely closed, the air valve 10B of the system of second regenerative heater 1B is now opened. After the air valve 10B has been completely opened, the M gas valve 6B also associated with the system of second regenerative heater 1B is opened and simultaneously the burner unit 2B of the system of third regenerative heater 1B is ignited by using a pilot burner or the like (not shown), as with the above case. At this time, because the exhaust valve 7B of the system of second regenerative heater 1B is already in the open state, air ejected from the burner unit 2B through the air valve 10B of the system of second regenerative heater 1B is direct exhausted. Also, since the burner unit 2B is ignited at the same time as when the M gas valve 6B of the system of-third regenerative heater 1B is opened, there is no possibility that the not-yet-burnt M gas remains and is exhausted to the exterior.

In this condition, the system of first regenerative heater 1A accumulates heat in the second regenerative chamber 4A while sucking and recovering $N_2$, the system of second regenerative heater 1B performs combustion of the burner unit 2B and accumulates heat in the first regenerative chamber 3B, and the system of third regenerative heater 1C performs heating and supply of $N_2$. Then, in a similar manner as explained above, when the temperature of $N_2$ supplied to the heating furnace from the third regenerative heater 1C lowers down to the lower limit value or when the temperature in the first regenerative chamber 3B of the second regenerative heater 1B in the combustion state rises up to the upper limit value, the M gas valve 6B of the second regenerative heater 1B which has been so far in the combustion state is closed, and after it has been completely closed, the air valve 10B also associated with the system of second regenerative heater 1B is closed so that the not-yet-burnt M gas is prevented from remaining there, and the combustion air is direct exhausted to the exhaust line to hold the non-oxidizing atmosphere or a reducing atmosphere in the heating furnace, as with the above case.

Subsequently, after the air valve 10B of the system of second regenerative heater 1B has been completely closed, the $N_2$ blow valve 8B also associated with the system of second regenerative heater 1B is opened, and at the same time the $N_2$ blow valve 8C of the system of third regenerative heater 1C which has been so far in the $N_2$ heating state is closed. Also in this case, a speed at which the amount of $N_2$ blown from the open-going $N_2$ blow valve 8B of the system of second regenerative heater 1B increases, and a speed at which the amount of $N_2$ blown from the close-going $N_2$ blow valve 8C of the system of third regenerative heater 1C decreases are set such that both the speeds are equal to each other in absolute amount, but different in direction from each other. Accordingly, by starting to open the $N_2$ blow valve 8B of the system of second regenerative heater 1B and close the $N_2$ blow valve 8C of the system of third regenerative heater 1C at the same time, the flow rate of the heated $N_2$ blown into the heating furnace during the above switching process can be always kept constant.

After the $N_2$ blow valve 8B of the system of second regenerative heater 1B has been completely opened and at the same time the $N_2$ blow valve 8C of the system of third regenerative heater 1C has been-completely closed, the exhaust vale 7B of the system of second regenerative heater 1B is closed. At the same time, the exhaust valve 7A of the system of first regenerative heater 1A which has been so far in the $N_2$ suction state is opened. Correspondingly, the $N_2$ recovery valve 9C of the system of third regenerative heater 1C is opened and at the same time the $N_2$ recovery valve 9A of the system of first regenerative heater 1A is closed. Also at this time, a speed at which the amount of gas exhausted through the close-going exhaust valve 7B of the system of second regenerative heater 1B decreases, and a speed at which the amount of gas exhausted through the open-going exhaust valve 7A of the system of first regenerative heater 1A increases per unit time are set such that both the speeds are equal to each other in absolute amount. Then, the operation of closing the exhaust valve 7B of the system of second regenerative heater 1B and the operation of opening the exhaust valve 7A of the system of first regenerative heater 1A are started at the same time. As a result, the total flow rate of the exhaust gas during the above switching process can be always kept constant. Further, a speed at which the amount of $N_2$ recovered through the open-going $N_2$ recovery valve 9B of the system of second regenerative heater 1B increases, and a speed at which the amount of $N_2$ recovered through the close-going $N_2$ recovery valve 9A of the system of first regenerative heater 1A increases are set such that both the speeds are equal to each other in absolute amount. Then, the operation of opening the $N_2$ recovery valve 9B of the system of second regenerative heater 1B and the operation of closing the $N_2$ recovery valve 9A of the system of first regenerative heater 1A are started at the same time. As a result, the flow rate of $N_2$ recovered during the above switching process can be always kept constant.

Next, after the exhaust valve 7B of the system of second regenerative heater 1B has been completely closed, the exhaust valve 7A of the system of first regenerative heater 1A has been completely opened, the $N_2$ recovery valve 9C of the system of third regenerative heater 1C has been completely opened, and the $N_2$ recovery valve 9A of the system of first regenerative heater 1A has been completely closed, the air valve 10A of the system of first regenerative heater 1A is now opened. After the air valve 10A has been completely opened, the M gas valve 6A also associated with the system of first regenerative heater 1A is opened and simultaneously the burner unit 2A of the system of first regenerative heater 1A is ignited by using a not-shown pilot burner or the-like, as with the above case. At this time, because the exhaust valve 7A of the system of first regenerative heater 1A is already in the open state, air ejected from the burner unit 2A through the air valve 10A of the system of first regenerative heater 1A is direct exhausted. Also, since the burner unit 2A is ignited at the same time as when the M gas valve 6A of the system of second regenerative heater 1A is opened, there is no possibility that the not-yet-burnt M gas remains and is exhausted to the exterior.

In this condition, the system of first regenerative heater 1A performs combustion of the burner unit 2A and accumulates heat in the first regenerative chamber 3A, the system of second regenerative heater 1B performs heating and supply of $N_2$, and the system of third regenerative heater 1C accumulates heat in the second regenerative chamber 4C while sucking and recovering $N_2$. Thus, this condition essentially coincides with the condition shown in the left-end area in FIG. 3. Accordingly, if the same switching conditions as mentioned above, the foregoing switching procedures are repeated successively. In each of the three systems of regenerative heaters 1A–1C, therefore, the combustion state, the $N_2$ heating and supply state, and the $N_2$ sucking and recovering state are repeated in sequence.

It is to be noted that, in this apparatus, a reducing gas containing inert gas such as Ar, $H_2$, etc. instead of $N_2$ can be used as the atmosphere gas.

The operation of the regenerative atmosphere-gas heating method and apparatus of this embodiment will be described below.

As mentioned before, there has been hitherto proposed the technique wherein two units of regenerative heaters in pair are employed and each alternately switched over between a combustion state and a state of heating and supplying an atmosphere gas ($N_2$ in this case) to continuously heat the atmosphere gas so that an object to be heated is heated by heat transmission through convection of the atmosphere gas. With this technique, however, the atmosphere gas must be direct exhausted to the exterior from a heating furnace or the like, for example, which is in a state filled with the atmosphere gas, or it must be exhausted through the regenerative heater which is in the combustion state. Taking into account thermal efficiency, particularly, it can be easily inferred as being a more advantageous way that the extra atmosphere gas is introduced from the regenerative heater in the combustion state to its regenerative chamber, thereby accumulating the developed heat of the atmosphere gas in the regenerative chamber, and the introduced atmosphere gas is utilized when heating a succeeding atmosphere gas. But, sucking the atmosphere gas in the regenerative chamber through the regenerative heater in the combustion state means that the combustion exhaust gas is also sucked simultaneously. Therefore, when it is required to hold a non-oxidizing atmosphere state or a reducing atmosphere state like the heating furnace of this embodiment, the atmosphere gas sucked through the regenerative chamber 4B and containing an O component, etc. cannot be used again directly as it is. It would be theoretically conceivable to separate the atmosphere gas containing the combustion exhaust gas into a combustion exhaust gas component and an atmosphere gas component again, or extract only the atmosphere gas component therefrom. Such an operation however requires a substantially high cost, includes wasteful procedures, and is difficult to realize.

On the other hand, in this embodiment, three units of regenerative heaters are employed and the $N_2$ (atmosphere gas) sucking (recovering) state is set in addition to the combustion state and the $N_2$ (atmosphere gas) heating (supply) state which are conventional as described above. By exhausting only the combustion exhaust gas from the regenerative heater at least in the combustion state, therefore, the atmosphere gas supplied to the heating furnace from one regenerative heater in the heating state can be recovered 100% or about 100% theoretically from another regenerative heater in the suction state. Because of a difficulty in making "0" the amount of the atmosphere gas brought out of the heating furnace in practice, it is thought that at least the atmosphere gas except the amount brought out can be recovered. The most noted feature of this embodiment resides in that both functions of heat recovery and atmosphere gas recovery, in particular, can be added simultaneously by providing the (atmosphere gas) sucking (recovering) state (step). The former function increases thermal efficiency and the latter function enables the atmosphere gas to be used again, thereby permitting a remarkable reduction in cost with regard to the atmosphere gas.

More specifically, relating to the above former function, this embodiment is arranged such that separate regenerative chambers, i.e., the second regenerative chambers 4A–4C, are disposed in respective lines for sucking (recovering) the atmosphere gas ($N_2$) and the combustion air is introduced to the second regenerative chambers 4A–4C in which heat has been accumulated. In other words, the second regenerative chambers 4A–4C each act as a preheater for the combustion air. Accordingly, the combustion air is preheated to a temperature near the atmosphere temperature beforehand, and the regenerative heater can shift to the combustion state quickly. Thus, the heating temperature obtained after shift to the combustion state can be started from a relatively high temperature, enabling the combustion temperature to rise more quickly. As a result, thermal efficiency can be improved remarkably and the shift from the atmosphere gas sucking (recovering) state to the combustion state can be made in a smoother continuous manner.

Relating to the above latter function, even in the case where the interior of the heating furnace must be kept in the non-oxidizing atmosphere condition, for example, like this embodiment, since the extra atmosphere gas can be all recovered, it is required to resupply the atmosphere gas just in amount corresponding to the amount that is brought out of the heating furnace or leaked to the open air as mentioned above. Consequently, not only the cost can be reduced, but also restrictions upon equipment from the point of an ability for supplying the atmosphere can be eliminated, which enables the present invention to be applied to large-scaled heating furnaces such as, particularly, employed in the steel industry. Further, by recovering the sucked atmosphere gas ($N_2$) to the common $N_2$ tank 16 and using the recovered $N_2$ gas again from the tank 16 as with this embodiment, the present invention can be effectively practiced, particularly, in the site where it is hard to generate or obtain the atmosphere gas. Moreover, in this embodiment, even if the combustion exhaust gas and an O component in the open air are mixed in the recovered atmosphere gas $N_2$ they can be effectively removed by the $O_2$ removing device 19 disposed in the circulation line provided with the fan 18 and the $O_2$ removing device 17 disposed in the $N_2$ supply line. As a result, 100% or about 100% of the recovered atmosphere gas $N_2$ can be used again.

Evaluation of thermal efficiency of this embodiment will now be discussed using practical numeral values. Returning to FIG. 1 again, the drawing represents the situation wherein the first regenerative heater 1A is in the combustion state, and the second regenerative heater 1B is in the $N_2$ heating state, and the third regenerative heater 1C is in the $N_2$ suction state.

In FIG. 1, one set of three regenerative heaters are schematically shown for easier understanding of an example in which such a set of three regenerative heaters are employed in plural number.

First, the flow rate of gas exhausted from the first regenerative heater 1A in the combustion state is set equal to or slightly larger than the flow rate of the combustion exhaust gas from the M gas and the combustion air both supplied to the first regenerative heater 1A, so that the combustion exhaust gas is surely exhausted and prevented from flowing into the heating furnace. Then, the flow rate of $N_2$ exhausted from the heating furnace to purge the combustion gas out of the first regenerative heater 1A is set to 1200 $Nm^3$/Hr or a minimum value as small as necessary from the operational point of view. Further, the amount of heat of the M gas supplied to the first regenerative heater 1A per unit time is 31240 Mcal/Hr and the temperature of the combustion exhaust gas exhausted when the combustion air of 30° C. is supplied to the first regenerative heater 1A is about 140° C.

On the other hand, assuming that the total surface area of a furnace body is 1000 $m^2$, the temperature difference is 50° C., and specific heat of the furnace body per unit area is 25 $Kcal/m^2Hr°$ C., heat radiated from the body of the heating furnace itself per unit time is given by furnace radiant heat=1000×50×25=1250 Mcal/Hr. Also, the flow rate of $N_2$ exhausted from the furnace body itself per unit time is 1500 $Nm^3$/Hr and the amount of heat of the exhausted $N_2$ per unit time is 430 Mcal/Hr.

In the second regenerative heater 1B under the $N_2$ heating state, when $N_2$ of 30° C. is supplied at a flow rate of 74500 $Nm^3$/Hr per unit time, the $N_2$ can be heated to 1600° C. The amount of heat of the heated $N_2$ is 41790 Mcal/Hr.

Based on the above practical values, the third regenerative heater 1C in the $N_2$ suction state can suck and recover $N_2$ of 71800 $Nm^3$/Hr except the $N_2$ flow rate of 1500 $Nm^3$/Hr exhausted from the furnace itself and the $N_2$ flow rate of 1200 $Nm^3$/Hr exhausted from the regenerative heater 1A, i.e., a total of 2700 $Nm^3$/Hr. Since the developed heat of the sucked $N_2$ provides a temperature of 900° C., the amount of heat of the sucked $N_2$ is 21390 Mcal/Hr. The developed heat of the sucked $N_2$ is accumulated in the second regenerative chamber 4C, and hence the developed heat of the recovered $N_2$ provides a temperature of 140° C.

Then, the $N_2$ supply source resupplies the $N_2$ tank 16 with an amount of $N_2$ corresponding to the amount that is exhausted from the heating furnace itself and the regenerative heater 1A, i.e., the $N_2$ flow rate of 2700 $Nm^3$/Hr.

As seen from the above, the heating efficiency of the heating furnace of this embodiment is given by heating efficiency=(41790−21390−1250−430)/31240×100=60% which is remarkably improved in comparison with the heating efficiency of conventional atmosphere heating furnaces that is about 50% at maximum. Also, $N_2$ is resupplied just corresponding to the $N_2$ flow rate of 2700 $Nm^3$/Hr exhausted from both the heating itself and the regenerative heater 1A. Although the $N_2$ flow rate of 2700 $Nm^3$/Hr is not a small value in itself, it can be thought that the flow rate of $N_2$ to be resupplied is sufficiently small in consideration of that the flow rate of $N_2$ supplied to the heating furnace is 74500 $Nm^3$/Hr and the flow rate of $N_2$ recovered from the heating furnace is 71800 $Nm^3$/Hr. Accordingly, the present invention can be relatively easily realized even in the situation requiring $N_2$ to be supplied at a large flow rate as with heating furnaces for steel materials, and is highly utilizable, particularly, even in the site where it is hard to generate or obtain the atmosphere gas. It is of course needless to mention that the cost can be further reduced by improving the efficiency of reuse of the atmosphere gas.

Additionally, by practicing the above-explained procedures in a combined manner, inflow of the combustion exhaust gas and suction of the open air into the heating furnace can be suppressed or prevented so that the non-oxidizing atmosphere state in the heating furnace can be kept. It is, however, also possible to suppress oxidization more positively or even reduce an oxide by, for example, changing the atmosphere surrounding such an object to be heated as used in the above-explained heating furnace into a reducing an atmosphere.

When $H_2$, for example, is used as a reducing gas to create a reducing atmosphere in the heating furnace, a well-known oxidization/reduction equilibrium curve is resulted on the basis of that, depending on the content of $H_2$, the content of $H_2O$ and the temperature, $H_2$ couples with O components of iron oxides $Fe_3O_4$ and FeO to reduce iron, or an O component of $H_2O$ oxidizes iron to produce iron oxides $Fe_3O_4$ and FeO. Then, by representing such an oxidization/reduction equilibrium curve in terms of $H_2/H_2O$ content ratio, an oxidization/reduction equilibrium curve for iron depending on the temperature is obtained. From this oxidization/reduction equilibrium curve, the $H_2/H_2O$ content ratio capable of reducing iron at a desired atmosphere temperature (about 1000° C. or above in this embodiment) can be determined. Judging from the oxidization/reduction equilibrium curve, the higher the atmosphere temperature, the smaller the amount of $H_2$ to be introduced by using $H_2$ as the reducing gas. It is hence believed that the use of $H_2$ is more advantageous in suppressing the content of the reducing gas below the explosion limit (flammability limit) content as described later.

Here, as well known, the flammability limit of $H_2$ is about 4% or below if leaked to the open air. From that flammability limit, an $H_2$ flammable lower limit curve is determined within the flammable limit range of a flow rate VH of added $H_2$ at a flow rate VN of $N_2$ supplied to the heating furnace. Supposing the vertical axis to indicate the flow rate of added $H_2$, therefore, an area above the $H_2$ flammable lower limit curve represents a flammable range of $H_2$ gas under the $N_2$ atmosphere, and hence gives rise to a problem from the safety point of view. On the other hand, it has been found that the flow rate of $H_2$ required to be added is extremely small if neither inflow of the combustion exhaust gas nor suction of the open air into the heating furnace occur at the flow rate of the supplied $N_2$ set as described above, and reduction of an iron oxide is efficiently accelerated. Accordingly, by adding an extremely small amount of $H_2$ in the supply line of the atmosphere gas, e.g., $N_2$, it is possible to create a reducing atmosphere in the heating furnace and to efficiently expedite reduction of the iron oxide, as needed.

It is of course also feasible to employ Ar as the inert gas and any of various carbonic acid gases, including CO, or a heavy hydrocarbon as the reducing gas. While the above embodiment has been explained in detail in connection with only the case of using $N_2$ as the inert gas and $H_2$ as the reducing gas, respectively, and superiority resulted from using such gases. When using such a carbon C-based reducing gas, however, a careful attention should be paid to the points below. Safety measures must be separately considered because of a possibility that the flammable range may spread. In addition, separation of solid C, i.e., the occurrence of soot, must be suppressed or prevented, and a flow rate of the carbon C-based reducing gas to be added must be set after minutely conducting studies, etc. from the thermodynamic point of view to determine whether the separation of solid C occurs or not.

Furthermore, the above embodiment has been explained in detail in connection with only the case of supplying $H_2$ as the reducing gas to the supply line of $N_2$ as the atmosphere gas. But, because the flow rate of $H_2$ required to be introduced is extremely small when the oxygen content is very low, as mentioned above, $H_2$ can be directly supplied to the interior of the heating furnace without being heated remarkably. It has been confirmed that the direct supply of $H_2$ does not substantially influence or drop the temperature of the heating furnace.

Moreover, when $H_2$ or the like is added as the reducing gas, a higher level of reducing state can be more easily obtained by extinguishing the pilot burner of the heater through which the atmosphere gas such as $N_2$ is introduced to the heating furnace. More specifically, in the case of heating a tundish according to the embodiment, since the flow rate of combustion exhaust gas produced by the pilot burner is not larger than 1% of introduced $N_2+H_2$ (atmosphere gas+reducing gas) and the component of oxidizing gas such as $CO_2$, $H_2O$, etc. is about 0.2%, there occurs no practical problem even if the pilot burner is not extinguished. However, when the flow rate of the introduced $N_2+H_2$ (inert gas+reducing gas) is small, extinguishing the pilot burner of the preheater on the side where $N_2+H_2$ is introduced is effective in obtaining a higher level of the non-oxidizing or reducing atmosphere state.

Second Embodiment

Figure 4:
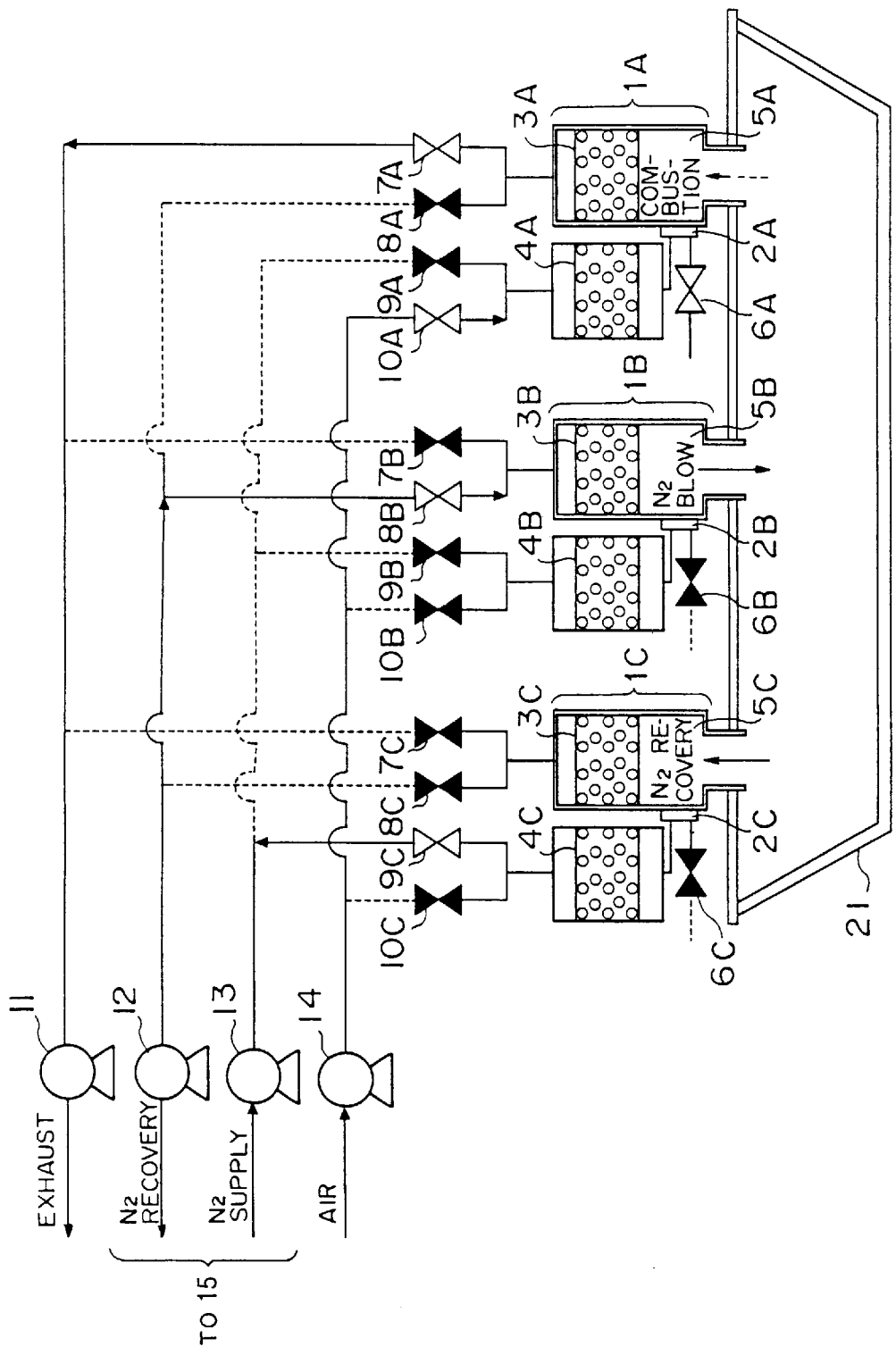
FIG. 4 is a schematic diagram of a second embodiment in which the regenerative atmosphere-gas heating method and apparatus of the present invention are implemented as a tundish heating furnace.

A second embodiment in which the regenerative atmosphere-gas heating method and apparatus of the present invention are implemented as an apparatus for retaining the temperature of a tundish will be described below with reference to FIG. 4. When applied to a tundish 21, the present invention is also particularly effective in the case of creating a non-oxidizing atmosphere state to suppress or prevent oxidization of remaining steel, and in the case of creating a reducing atmosphere, similar to that mentioned above, to reduce the oxidization of the remaining steel.

The regenerative atmosphere-gas heating apparatus used in this embodiment for retaining the temperature of the tundish is similar to that used in the above first embodiment and is constructed by reversing the layout of the regenerative atmosphere-gas heating apparatus shown in FIG. 1 and attaching it to a cover portion of the tundish 21. Therefore, equivalent components are denoted by the same numerals and detailed explanation thereof is omitted here. In the apparatus of FIG. 4, a regenerative heater at the right end corresponds to the first regenerative heater 1A in the above first embodiment. Likewise, a regenerative heater in a central portion corresponds to the second regenerative heater 1B and a regenerative heater at the left end corresponds to the third regenerative heater 1C, respectively. Further, the combustion state, the $N_2$ heating state and the $N_2$ suction state of each system of the regenerative heaters 1A–1C are switched over in the same way as shown in FIG. 2 and various associated control valves are switched over in the same way as shown in the sequence chart of FIG. 3. Though not shown, the $N_2$ recovery fan 12 is connected directly to the $N_2$ tank 16 of the $N_2$ supply source 15, and the $N_2$ blow fan 13 is connected to the $N_2$ tank 16, common to the above tank, of the $N_2$ supply source 15 through the $O_2$ removing device 17.

The object and operation of the apparatus for retaining the temperature of the tundish according to this embodiment will be described below. As well known, a tundish being not in use is required to be held or heated up to a predetermined temperature or above to suppress or prevent hardening of the remaining steel and hardening of molten steel when used again. According to studies made by the inventors of the present invention, the inner surface temperature of the tundish is required to be held not lower than 850° C. that is a lower limit of the casting-enable temperature. In the past, therefore, it has been customary to supply a fuel gas to the tundish and burn the fuel gas in the tundish for preheating the tundish. This conventional method is not preferable in that oxidization of the remaining steel is expedited due to an O component generated upon the combustion and steel quality is deteriorated. Also, it is impossible in practice to make "0" the amount of air entering, from the exterior, the tundish in which the steel continues contracting with a temperature drop. In view of such a problem, the inventors have accomplished this embodiment by finding that if an inert atmosphere gas (also $N_2$ in this embodiment) heated outside the tundish is introduced to the tundish to continuously purge gas therefrom while keeping the inner surface temperature of the tundish not lower than 850° C. that is a lower limit of the casting-enable temperature, conventional preheating with combustion of a fuel gas in the tundish can be dispensed with, and the tundish can be used again with no need of preheating while preventing oxidization of the remaining steel.

In this embodiment, therefore, as with the above first embodiment, the system of regenerative heater in the combustion state (the first regenerative heater 1A in FIG. 4) is required to exhaust gas at a flow rate just equal to or slightly larger than that of the combustion exhaust gas generated there so that the combustion exhaust gas is prevented from flowing into the tundish. Also, the correlation between the flow rate of $N_2$ supplied from the system of regenerative heater in the $N_2$ heating state (the second regenerative heater 1B in FIG. 4) which supplies the heated $N_2$ to the tundish, and the flow rate of $N_2$ sucked by the system of regenerative heater in the $N_2$ suction state (the third regenerative heater 1C in FIG. 4) which sucks extra $N_2$ in the tundish is set such that the former is at least slightly larger than the latter. Further, if the flow rate of gas exhausted by the system of regenerative heater 1A in the combustion state is slightly larger than that of the combustion exhaust gas, it is required to set the former $N_2$ flow rate larger than the latter $N_2$ flow rate by an amount in view of the above difference so that the interior of the tundish is always kept in a positive pressure condition to suppress or prevent air from being sucked into the tundish from the exterior.

Other details are the same as in the above first embodiment.

Third Embodiment

A third embodiment in which the regenerative atmosphere-gas heating method and apparatus of the present invention are implemented as an apparatus for heating a strip will be described below with reference to FIG. 5. When applied to a strip heating apparatus, the present invention is also particularly effective in the case of creating a non-oxidizing atmosphere state in the heating apparatus to suppress or prevent oxidization of a strip, and in the case of creating a reducing atmosphere, similar to that mentioned above, in the heating apparatus to reduce the oxidization of the strip.

The regenerative atmosphere-gas heating apparatus used in such a strip heating apparatus is constructed by preparing, as one set, the regenerative atmosphere-gas heating apparatus of the above first embodiment shown in FIG. 1 as it is, preparing another set of regenerative atmosphere-gas heating apparatus shown in FIG. 1 reversed in layout from the one set, and installing the two sets in opposed relation on both sides of a plenum chamber through which a strip 22 passes. Therefore, equivalent components are denoted by the same numerals and detailed explanation thereof is omitted here. In FIG. 5, each of regenerative heaters at the top of the two sets of regenerative atmosphere-gas heating apparatus disposed in pair on the left and right sides corresponds to the first regenerative heater 1A in the above first embodiment. Likewise, each of regenerative heaters at the center corresponds to the second regenerative heater 1B and each of regenerative heaters at the bottom corresponds to the third regenerative heater 1C, respectively. Further, the combustion state, the $N_2$ heating state and the $N_2$ suction state of each system of the regenerative heaters 1A–1C are switched over in the same way as shown in FIG. 2 and various associated control valves are switched over in the same way as shown in the sequence chart of FIG. 3. Though not shown, the $N_2$ recovery fan 12 is connected directly to the $N_2$ tank 16 of the $N_2$ supply source 15, and the $N_2$ blow fan 13 is connected to the $N_2$ tank 16, common to the above tank, of the $N_2$ supply source 15 through the $O_2$ removing device 17.

The object and operation of the strip heating apparatus according to this embodiment will be described below. In a strip continuous annealing furnace or the like, for example, the atmosphere gas is generally heated with heat radiating from the above-mentioned radiant tube. As explained before, however, the heating method and apparatus using the radiant tube have problems that the tube life is short and fine adjustment of temperature is difficult to achieve, particularly, in a short time. This is attributable to such a feature of the radiant heating method that when the temperature difference between an object to be heated and an atmosphere becomes small, the method is no longer effective in heating the object to be heated and the temperature of the object to be heated is saturated.

On the other hand, the temperature of an atmosphere gas (also $N_2$ in this embodiment) heated by the regenerative heaters is about 1500° C., as mentioned above, and is far higher than the strip setting temperature (about 800° C.) necessary for general continuous annealing furnaces. By blowing such an atmosphere gas directly to both sheet surfaces of the strip, therefore, the strip can be quickly heated even with the pass length of the strip being short. This is because convection heat transmission effected by blowing gas at a sufficiently high temperature to heat the object to be heated is carried out on condition that a heat transmission area of the object to be heated, i.e., the sheet surfaces of the strip, is sufficiently wide and the strip is sufficiently thin.

Figure 5:
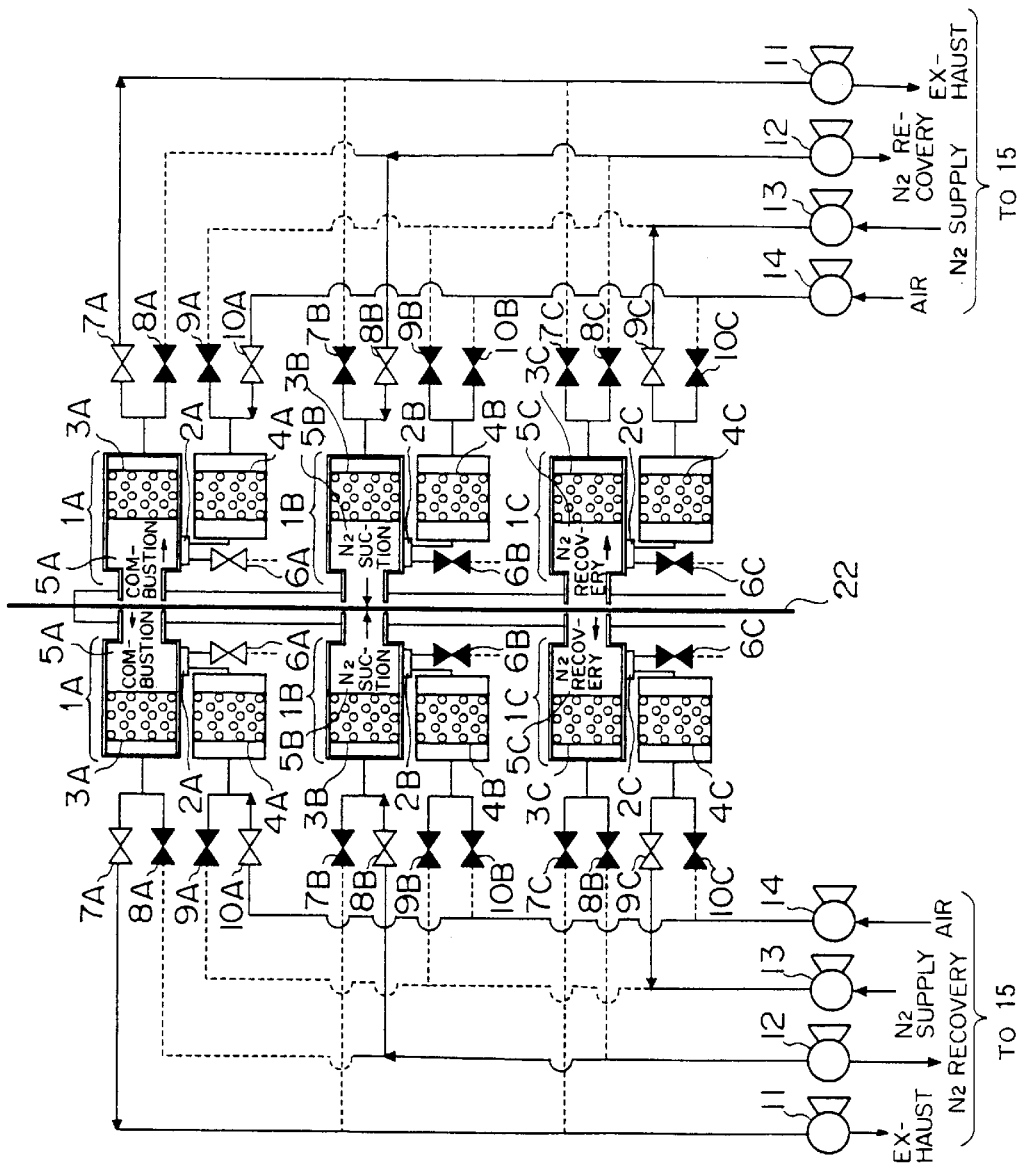
FIG. 5 is a schematic diagram of a third embodiment in which the regenerative atmosphere-gas heating method and apparatus of the present invention are implemented as a strip heating furnace.

In a continuous annealing furnace wherein a strip is required to reside therein for a predetermined time, i.e., wherein a strip passing speed is set to a constant value and a substantial pass length is necessary, however, it is practically difficult to install a plurality of strip heating apparatus made up of regenerative heaters, which occupy large spaces for installation, along the overall length of the pass length, as will be apparent from FIG. 5. In this embodiment, therefore, the regenerative heaters are provided in the so-called chance free section on the delivery side of an ordinary heating section or the like. The term "chance free section" has been hitherto used as meaning a heat treating section in which, when heat-treating a strip formed by joining a plurality of steel sheets being different in dimension, e.g., sheet thickness, to each other, the sheet temperature can be finely controlled in a short time depending on the current condition of each steel sheet. But, there has not been practical measures for actually realizing such fine control. The strip heating apparatus of this embodiment is provided as realizing the chance free section because it can finely adjust the sheet temperature in a short time.

In the strip heating apparatus of this embodiment, similarly to conventional continuous annealing furnaces, a certain amount of atmosphere gas is unavoidably brought out to the exterior. Accordingly, as with the above embodiments, the system of regenerative heater in the combustion state (each first regenerative heater 1A in FIG. 5) is required to exhaust gas at a flow rate just equal to or slightly larger than that of the combustion exhaust gas generated there so that the combustion exhaust gas is prevented from flowing into the plenum chamber. Also, the systems of regenerative heaters in the $N_2$ heating state (the second regenerative heaters 1B in FIG. 5) are required to supply $N_2$ at a larger flow rate than the flow rate of $N_2$ sucked and recovered by the systems of regenerative heaters in the $N_2$ suction state (the third regenerative heaters 1C in FIG. 5) by an amount corresponding to the flow rate of $N_2$ that is brought out to the exterior, thereby preventing air from being sucked into the plenum chamber from the exterior.

The strip heating apparatus is also applicable to various heating furnaces and soaking furnaces other than the continuous annealing furnace. In those cases, the atmosphere gas will be required to be heated to 900° C. or above. In individual one of the heating furnaces and the soaking furnaces, temperature may be set differently depending on respective heat treating sections such as a preheating section, a heating section and a soaking section.

Other details are the same as in the above first embodiment.

Incidentally, by installing the strip heating apparatus of this embodiment, replacement of the radiant tube is no longer needed and a remarkable reduction in the repairing cost was achieved.

Fourth Embodiment

A fourth embodiment in which the regenerative atmosphere-gas heating method and apparatus of the present invention are implemented as an apparatus for heating a bloom will be described below with reference to FIG. 6. When applied to a bloom heating apparatus, the present invention is also particularly effective in the case of creating a non-oxidizing atmosphere state in the heating apparatus to suppress or prevent oxidization of a bloom, and in the case of creating a reducing atmosphere, similar to that mentioned above, in the heating apparatus to reduce the oxidization of the bloom.

The regenerative atmosphere-gas heating apparatus used in such a bloom heating apparatus is constructed by preparing, as one set, the regenerative atmosphere-gas heating apparatus of the above first embodiment shown in FIG. 1 as it is, arranging another set of regenerative atmosphere-gas heating apparatus shown in FIG. 1, which is reversed in layout from the one set, in zigzag relation to the one set to prepare one pair of regenerative atmosphere-gas heating apparatus, and installing the pair in each of upper and lower portions of a furnace through which a bloom 24 passes. Therefore, equivalent components are denoted by the same numerals and detailed explanation thereof is omitted here. But, in this embodiment, chambers 23 are extended from respective openings of the regenerative heaters 1A–1C to occupy upper and lower areas of the bloom passing furnace, and a plurality of blow holes are formed in appropriate positions of each chamber 23 to face a heated bloom. Then, a heated atmosphere gas (also $N_2$ in this embodiment) is blown out through the blow holes directly toward bloom surfaces, and the atmosphere gas around the bloom surfaces is sucked through the blow holes. In FIG. 6a, each of regenerative heaters at the top of the two sets of regenerative atmosphere-gas heating apparatus disposed in pair on the left and right sides corresponds to the first regenerative heater 1A in the above first embodiment. Likewise, each of regenerative heaters at the center corresponds to the second regenerative heater 1B and each of regenerative heaters at the bottom corresponds to the third regenerative heater 1C, respectively. Further, the combustion state, the $N_2$ heating state and the $N_2$ suction state of each system of the regenerative heaters 1A–1C are switched over in the same way as shown in FIG. 2 and various associated control valves are switched over in the same way as shown in the sequence chart of FIG. 3. Though not shown, the $N_2$ recovery fan 12 is connected directly to the $N_2$ tank 16 of the $N_2$ supply source 15, and the $N_2$ blow fan 13 is connected to the $N_2$ tank 16, common to the above tank, of the $N_2$ supply source 15 through the $O_2$ removing device 17.

The object and operation of the bloom heating apparatus according to this embodiment will be described below. In the strip heating apparatus of the above third embodiment, for example, because the sheet surface area of the strip is large, the sheet thickness is sufficiently thin, and the sheet surfaces are relatively stable during passing through the apparatus, it is possible to evenly heat the strip in a relatively short time or achieve fine adjustment of the sheet temperature by arranging the openings of the regenerative heaters close to the sheet surfaces of the strip, and blowing a heated atmosphere gas such as $N_2$ directly to the sheet surfaces of the strip from the heater openings or applying the heated $N_2$ as an atmosphere gas. For a bloom in the form of a thick plate, however, the heated atmosphere gas $N_2$ is required to be blown directly to the bloom 24. In this embodiment, therefore, a group of regenerative heaters comprising four sets in total are provided to simultaneously blow the heated atmosphere gas $N_2$ directly toward the bloom surfaces from the four sets of regenerative heaters so that the bloom can be heated quickly. Further, in this embodiment, by evenly blowing the heated atmosphere gas $N_2$ toward both sides of the bloom, temperature variations in the direction of thickness of the plate thickness can be suppressed.

In the bloom heating apparatus of this embodiment, similarly to conventional continuous annealing furnaces, a certain amount of atmosphere gas is unavoidably brought out to the exterior. Accordingly, the system of regenerative heater in the combustion state (each first regenerative heater 1A in FIG. 6) is required to exhaust gas at a flow rate just equal to or slightly larger than that of the combustion exhaust gas generated there so that the combustion exhaust gas is prevented from flowing into the chamber 23. Also, the systems of regenerative heaters in the $N_2$ heating state (the second regenerative heaters 1B in FIG. 6) are required to supply $N_2$ at a larger flow rate than the flow rate of $N_2$ sucked and recovered by the systems of regenerative heaters in the $N_2$ suction state (the third regenerative heaters 1C in FIG. 6) by an amount corresponding to the flow rate of $N_2$ that is brought out to the exterior, thereby preventing air from being sucked into the chambers from the exterior.

Other details are the same as in the above first embodiment.

Any of the above embodiments has been described in detail in connection with only the case of the second regenerative chamber being disposed in each line for sucking and recovering $N_2$. Of course, it is true that with the provision of the second regenerative chamber, the developed heat of the sucked $N_2$ atmosphere gas can be accumulated for conversion into developed heat of the combustion air used in the subsequent combustion state, for example, and thermal efficiency can be improved correspondingly. But, because another major object of the present invention is to recover the atmosphere gas and use it again, it is not necessarily required to accumulate the developed heat of the recovered atmosphere gas and use the accumulated heat again. From this point of view, although a considerable loss of thermal efficiency is resulted, a regenerative chamber is not necessarily required in the line for sucking and recovering the atmosphere gas. This corresponds to the regenerative heating method defined in Claim 1 of the present invention. Further, while three units of regenerative heaters are used as one set in any of the above embodiments, the regenerative atmosphere-gas heating method and apparatus of the present invention may include the units of regenerative heaters in any number not less than three. More specifically, when four units of regenerative heaters, for example, are used, always two of the four units may be held, for example, in the combustion state, while the remaining two units may be held one in the atmosphere gas heating state and the other in the atmosphere gas sucking state, respectively. As an alternative, any one of the four units of regenerative heaters may be brought into a rest in turn and the remaining three units of regenerative heaters may be brought into the combustion state, the atmosphere gas heating state and the atmosphere gas sucking state in sequence (but thermal efficiency is lowered in this case). In other words, how many units of regenerative heaters are operated in each of the combustion state, the atmosphere gas heating state and the atmosphere gas sucking state is not an essential problem, and it is essential that the apparatus condition is switched over in the sequence of the combustion state, the atmosphere gas heating state and the atmosphere gas sucking state. This feature enables the atmosphere gas to be recovered and used again. Then, providing the regenerative chamber in the atmosphere gas sucking line enables thermal efficiency to be further improved.

As mentioned above, the present invention relates to the atmosphere gas heating method and apparatus for continuously heating and supplying an atmosphere gas necessary to heat an object to be heated. Therefore, the atmosphere gas used is not particularly limited, and the present invention is also applicable to almost all kinds of atmosphere gases which are usually used in ordinary heating methods and apparatus. Above all, the present invention is especially suitable for when the object to be heated must be heated in a non-oxidizing or reducing atmosphere.

INDUSTRIAL APPLICABILITY

According to the present invention, as described above, while continuously supplying a heated atmosphere gas, an extra atmosphere gas can be continuously recovered and used again for heating and supplying a succeeding atmosphere gas. This enables the temperature of a combustion exhaust gas in the combustion state to rise quickly immediately after the start of combustion. In other words, the heating can be started from a relatively high temperature, and hence overall thermal efficiency can be increased, including, e.g., the process of heat being accumulated in the first regenerative chamber under the combustion state. Also, since the temperature of the combustion exhaust gas rise quickly, a shift of from the atmosphere gas sucking state to the combustion state, in particular, is expedited and the operation can be continued in a smoother manner. Further, by using nitrogen, argon or other similar gas as an atmosphere gas, it is possible to maintain the atmosphere gas as a non-oxidizing atmosphere gas. Accordingly, the heated atmosphere gas can be applied to, e.g., an object to be heated, such as a tundish or strip, which requires a non-oxidizing condition. Also, by mixing a reducing gas to the atmosphere gas, it is possible to maintain the atmosphere gas as a reducing atmosphere gas. Accordingly, the heated atmosphere gas can be applied to, e.g., an object to be heated, such as a tundish or strip, which requires a non-oxidizing and reducing condition. Then, by connecting a supply line and a recovery line for the atmosphere gas to the same atmosphere gas supply source, the atmosphere gas recovered in the atmosphere gas sucking state can be surely used again in the succeeding atmosphere gas heating state. As a result, the cost of raw materials can be reduced correspondingly.

Thus, according to the present invention, the temperature of the combustion exhaust gas can be quickly raised to improve thermal efficiency. It is further possible to maintain a non-oxidizing atmosphere gas by using nitrogen or argon as the atmosphere gas, to create a reducing atmosphere by mixing a reducing gas to the atmosphere gas, and to cut down the cost by recovering the atmosphere gas for reuse.

The present invention relates to the atmosphere gas heating method and apparatus for continuously heating and supplying an atmosphere gas necessary to heat an object to be heated. Therefore, the atmosphere gas used is not particularly limited, and the present invention is also applicable to almost all kinds of atmosphere gases which are usually used in ordinary heating methods and apparatus. Above all, the present invention is especially suitable for when the object to be heated must be heated in a non-oxidizing or reducing atmosphere.

In addition, the following advantages are resulted by applying the apparatus of the present invention to a non-oxidizing or reducing atmosphere:

(1) Since a high-temperature atmosphere gas is blown directly for heating, heating efficiency can be increased 10% or more in comparison with the conventional radiant tube heating process.

(2) Because of direct heating with ejection of high-temperature gas, temperature control in raising the temperature of an object to be heated is improved. This feature also provides better heat transmission, a higher temperature rising speed, a smaller furnace size, and a less expensive construction cost than obtainable with the radiant tube heating process which is based on radiant heat transmission alone.

(3) The conventional method using a reducing burner to burn fuel in an imperfect combustion state and form a non-oxidizing or reducing atmosphere causes a large amount of gas that adversely affects human bodies and environment, such as a CO gas. By contrast, according to the method of the present invention, a reducing atmosphere can be formed by only clean gas that does not affect human bodies and environment, such as $H_2$. Further, depending on conditions, the amount of used flammable gas such as $H_2$ can be cut down to below a flammable limit in the open air and kept at a minimum necessary value. Thus, reduction heating can be achieved with a lower running cost, more friendly to environment, and higher safety than with the conventional method.

(4) Since the apparatus of the present invention employs no radiant tube, the replacement cost of the radiant tube is no longer needed and a remarkable reduction in the repairing cost can be achieved in comparison with the radiant tube heating process.

I claim:

1. A regenerative atmosphere-gas heating method for heating an atmosphere gas by using burner units and three or more units of regenerative heaters including regenerative chambers provided in lines for exhausting combustion exhaust gases from said regenerative heaters, wherein at least one or more of said three or more units of regenerative heaters are each brought into a combustion state in which heat is accumulated in the corresponding regenerative chamber by operating a burner unit corresponding to the regenerative chamber to perform combustion and exhausting only the combustion exhaust gas or substantially only the combustion exhaust gas produced with the combustion through said regenerative chamber, at least other one or more units of said regenerative heaters are each brought into an atmosphere gas heating state in which the atmosphere gas is passed through the corresponding regenerative chamber to heat and supply the atmosphere gas, and at least other one or more units of said regenerative heaters are each brought into an atmosphere gas sucking state in which the atmosphere gas is sucked and recovered, said regenerative heaters being each switched over to take the combustion state, the atmosphere gas heating state and the atmosphere gas sucking state successively in this order so that the heated atmosphere gas is supplied continuously.

2. The regenerative atmosphere-gas heating method according to claim 1, wherein one of the nitrogen and argon gases or a mixture of both the gases is used as said atmosphere gas.

3. The regenerative atmosphere-gas heating method according to claim 1, wherein said atmosphere gas is used as a reducing high-temperature gas by mixing a reducing gas to said atmosphere gas.

4. A regenerative atmosphere-gas heating method for heating an atmosphere gas by using burner units and three or more units of regenerative heaters including first regenerative chambers provided in lines for exhausting combustion exhaust gases from said regenerative heaters and second regenerative chambers provided in lines for sucking the atmosphere gas, wherein at least one or more of said three or more units of regenerative heaters are each brought into a combustion state in which heat is accumulated in the corresponding first regenerative chamber by operating a burner unit corresponding to the regenerative chamber to perform combustion and exhausting only the combustion exhaust gas or substantially only the combustion exhaust gas produced with the combustion through said first regenerative chamber, at least other one or more units of said regenerative heaters are each brought into an atmosphere gas heating state in which the atmosphere gas is passed through the corresponding first regenerative chamber to heat and supply the atmosphere gas, and at least other one or more units of said regenerative heaters are each brought into an atmosphere gas sucking state in which the atmosphere gas is sucked and recovered after being passed through the corresponding second regenerative chamber, for thereby accumulating heat in said second regenerative chamber, said regenerative heaters being each switched over to take the combustion state, the atmosphere gas heating state and the atmosphere gas sucking state successively in this order so that the heated atmosphere gas is supplied continuously.

5. The regenerative atmosphere-gas heating method according to claim 2, wherein combustion air or part thereof supplied to said burner unit is supplied to said regenerative heater in the combustion state after being passed through said second regenerative chamber in which heat has been accumulated in the atmosphere gas sucking state.

6. The regenerative atmosphere-gas heating method according to claim 4, wherein one of nitrogen and argon gases or a mixture of both the gases is used as said atmosphere gas.

7. The regenerative atmosphere-gas heating method according to claim 4, wherein said atmosphere gas is used as a reducing high-temperature gas by mixing a reducing gas to said atmosphere gas.

8. A regenerative atmosphere-gas heating apparatus for continuously supplying a high-temperature atmosphere gas heated by using at least three or more units of regenerative heaters, wherein each of said regenerative heaters includes a combustion burner unit, a first regenerative chamber provided in a line for exhausting a combustion exhaust gas from said regenerative heaters, and a second regenerative chamber provided in a line for sucking the atmosphere gas, at least one or more of said three or more units of regenerative heaters are each brought into a combustion state in which heat is accumulated in said first regenerative chamber by operating said burner unit to perform combustion and exhausting only the combustion exhaust gas or substantially only the combustion exhaust gas produced with the combustion through said first regenerative chamber, at least other one or more units of said regenerative heaters are each brought into an atmosphere gas heating state in which the atmosphere gas is passed through said first regenerative chamber to heat and supply the atmosphere gas, and at least other one or more units of said regenerative heaters are each brought into an atmosphere gas sucking state in which the atmosphere gas is sucked and recovered after being passed through said second regenerative chamber, for thereby accumulating heat in said second regenerative chamber, said regenerative heaters being each switched over to take the combustion state, the atmosphere gas heating state and the atmosphere gas sucking state successively in this order.

9. The regenerative atmosphere-gas heating apparatus according to claim 8, wherein said second regenerative chamber of each of said regenerative heaters is a preheater for combustion air supplied to said burner unit.

10. The regenerative atmosphere-gas heating apparatus according to claim 8, wherein a supply line of said atmosphere gas and a recovery line of said atmosphere gas are connected to an atmosphere gas supply source including an atmosphere gas tank common to said supply and recovery lines.

11. The regenerative atmosphere-gas heating apparatus according to claim 8, wherein one of nitrogen and argon gases or a mixture of both the gases is used as said atmosphere gas.

12. The regenerative atmosphere-gas heating apparatus according to claim 8, wherein said atmosphere gas is used as a reducing high-temperature gas by mixing a reducing gas to said atmosphere gas.

* * * * *